US011949673B1

(12) United States Patent
Sanchez

(10) Patent No.: US 11,949,673 B1
(45) Date of Patent: Apr. 2, 2024

(54) GESTURE AUTHENTICATION USING A SMART RING

(71) Applicant: BlueOwl, LLC, San Francisco, CA (US)

(72) Inventor: Kenneth Jason Sanchez, San Francisco, CA (US)

(73) Assignee: BLUEOWL, LLC, San Francisco, CA (US)

( * ) Notice: Subject to any disclaimer, the term of this patent is extended or adjusted under 35 U.S.C. 154(b) by 16 days.

(21) Appl. No.: 16/927,358

(22) Filed: Jul. 13, 2020

Related U.S. Application Data

(60) Provisional application No. 62/980,726, filed on Feb. 24, 2020, provisional application No. 62/877,391, filed on Jul. 23, 2019.

(51) Int. Cl.
*H04L 9/40* (2022.01)
*G06F 1/16* (2006.01)
*G06F 21/35* (2013.01)

(52) U.S. Cl.
CPC .......... *H04L 63/0853* (2013.01); *G06F 21/35* (2013.01); *H04L 63/0861* (2013.01); *G06F 1/163* (2013.01); *H04L 2463/082* (2013.01)

(58) Field of Classification Search
CPC ............. H04L 63/0853; H04L 63/0861; H04L 2463/082; G06F 21/35; G06F 1/163
See application file for complete search history.

(56) References Cited

U.S. PATENT DOCUMENTS 6,097,480 A 8/2000 Kaplan
6,154,658 A 11/2000 Caci
(Continued)

FOREIGN PATENT DOCUMENTS

CN 104799509 A 7/2015
CN 105841851 A 8/2016
(Continued)

OTHER PUBLICATIONS

"How to find your ideal bedtime with the Oura app", available online at <https://web.archive.org/web/20191206205332/https://ouraring.com/how-to-find-your-ideal-bedtime-with-the-oura-app/>, 2019, 8 pages.
(Continued)

*Primary Examiner* — Farid Homayounmehr
*Assistant Examiner* — Brian William Avery
(74) *Attorney, Agent, or Firm* — BRYAN CAVE LEIGHTON

(57) ABSTRACT

Systems and methods for performing multi-factor authentication using a smart ring are disclosed. An exemplary method includes performing a first authentication operation by: collecting, by sensors, gestural data representing a candidate gesture corresponding to ring movement; comparing the candidate gesture to an authentication gesture for a known user; when the candidate gesture matches the authentication gesture, generating a first signal indicating that a particular user has been identified and authenticated as the known user; and transmitting the first signal to a second device, wherein the second device controls access to a resource. The method also includes performing a second authentication operation by detecting contact between the ring and an external component; and generating and transmitting a second signal in response to detecting the contact, and when the second device receives the first and the second signals, causing the second device to grant the particular user access to the resource.

20 Claims, 8 Drawing Sheets

(56) References Cited

U.S. PATENT DOCUMENTS

| | | |
|---|---|---|
| 6,560,993 B1 | 5/2003 | Bosque et al. |
| 7,013,674 B2 | 3/2006 | Kretchmer |
| 7,500,746 B1 | 3/2009 | Howell et al. |
| 7,872,444 B2 | 1/2011 | Hamilton et al. |
| 8,075,484 B2 | 12/2011 | Moore-Ede |
| 8,446,275 B2 | 5/2013 | Utter, II |
| 8,570,273 B1 | 10/2013 | Smith |
| 9,248,839 B1 | 2/2016 | Tan |
| 9,362,775 B1 | 6/2016 | Jacobs |
| 9,420,260 B2 | 8/2016 | McGregor et al. |
| 9,440,657 B1 | 9/2016 | Fields et al. |
| 9,477,146 B2 | 10/2016 | Xu et al. |
| 9,509,170 B2 | 11/2016 | Wu |
| 9,628,707 B2 | 4/2017 | Blum et al. |
| 9,660,488 B2 | 5/2017 | Breedvelt-Schouten et al. |
| 9,696,690 B2 | 7/2017 | Nguyen et al. |
| 9,711,060 B1 | 7/2017 | Lusted et al. |
| 9,711,993 B2 | 7/2017 | Seonman |
| 9,717,949 B1 | 8/2017 | Tran et al. |
| 9,756,301 B2 | 9/2017 | Li et al. |
| 9,847,020 B2 | 12/2017 | Davis |
| 9,861,314 B2 | 1/2018 | Haverinen et al. |
| 9,908,530 B1 | 3/2018 | Fields et al. |
| 9,931,976 B1 | 4/2018 | Terwilliger et al. |
| 9,955,286 B2 | 4/2018 | Segal |
| 9,956,963 B2 | 5/2018 | Kumar et al. |
| 9,965,761 B2 | 5/2018 | Elangovan et al. |
| 10,007,355 B2 | 6/2018 | Schorsch et al. |
| 10,085,695 B2 | 10/2018 | Ouwerkerk et al. |
| 10,099,608 B2 | 10/2018 | Cuddihy et al. |
| 10,102,510 B2 | 10/2018 | Yau et al. |
| 10,137,777 B2 | 11/2018 | Lu et al. |
| 10,315,557 B2 | 6/2019 | Terwilliger et al. |
| 10,317,940 B2 | 6/2019 | Eim et al. |
| 10,359,846 B2 | 7/2019 | Priyantha et al. |
| 10,366,220 B2 | 7/2019 | Shapiro et al. |
| 10,396,584 B2 | 8/2019 | Madau et al. |
| 10,409,327 B2 | 9/2019 | Stotler |
| 10,444,834 B2 | 10/2019 | Vescovi et al. |
| 10,463,141 B2 | 11/2019 | Fitzgerald et al. |
| 10,629,175 B2 | 4/2020 | Yan et al. |
| 10,664,842 B1 | 5/2020 | Bermudez et al. |
| 10,693,872 B1 | 6/2020 | Larson et al. |
| 10,703,204 B2 | 7/2020 | Hassan et al. |
| 10,745,032 B2 | 8/2020 | Scheggi |
| 10,762,183 B1 | 9/2020 | Charan et al. |
| 11,227,060 B1* | 1/2022 | John ............... G06F 21/606 |
| 11,312,299 B1 | 4/2022 | Assam |
| 11,479,258 B1 | 10/2022 | Sanchez |
| 11,637,511 B2 | 4/2023 | Sanchez |
| 2002/0121831 A1 | 9/2002 | Egawa et al. |
| 2004/0090210 A1 | 5/2004 | Becker et al. |
| 2004/0200235 A1 | 10/2004 | Kretchmer |
| 2005/0054941 A1 | 3/2005 | Ting et al. |
| 2005/0230596 A1 | 10/2005 | Howell et al. |
| 2006/0250043 A1 | 11/2006 | Chung |
| 2008/0068559 A1 | 3/2008 | Howell et al. |
| 2008/0218684 A1 | 9/2008 | Howell et al. |
| 2008/0275309 A1 | 11/2008 | Stivoric et al. |
| 2011/0007035 A1 | 1/2011 | Shai |
| 2012/0184367 A1 | 7/2012 | Parrott et al. |
| 2013/0335213 A1 | 12/2013 | Sherony et al. |
| 2014/0091659 A1 | 4/2014 | Suzuki et al. |
| 2014/0107493 A1 | 4/2014 | Yuen et al. |
| 2014/0118704 A1 | 5/2014 | Duelli et al. |
| 2014/0120983 A1 | 5/2014 | Lam |
| 2014/0218529 A1 | 8/2014 | Mahmoud et al. |
| 2014/0238153 A1 | 8/2014 | Wood et al. |
| 2014/0240132 A1 | 8/2014 | Bychkov |
| 2014/0309849 A1 | 10/2014 | Ricci |
| 2015/0003693 A1 | 1/2015 | Baca et al. |
| 2015/0019266 A1 | 1/2015 | Stempora |
| 2015/0046996 A1 | 2/2015 | Slaby et al. |
| 2015/0062086 A1 | 3/2015 | Nattukallingal |
| 2015/0065090 A1* | 3/2015 | Yeh ....................... H04W 12/06 455/563 |
| 2015/0124096 A1 | 5/2015 | Koravadi |
| 2015/0126824 A1 | 5/2015 | Leboeuf et al. |
| 2015/0158499 A1 | 6/2015 | Koravadi |
| 2015/0220109 A1 | 8/2015 | Von et al. |
| 2015/0277559 A1* | 10/2015 | Vescovi ............... G06F 3/0416 345/173 |
| 2015/0338926 A1 | 11/2015 | Park et al. |
| 2015/0352953 A1 | 12/2015 | Koravadi |
| 2016/0028267 A1 | 1/2016 | Lee et al. |
| 2016/0098530 A1 | 4/2016 | Dill et al. |
| 2016/0226313 A1 | 8/2016 | Okubo |
| 2016/0236692 A1 | 8/2016 | Kleen et al. |
| 2016/0292563 A1 | 10/2016 | Park |
| 2016/0317060 A1 | 11/2016 | Connor |
| 2016/0334901 A1 | 11/2016 | Rihn |
| 2016/0336758 A1 | 11/2016 | Breedvelt-Schouten et al. |
| 2016/0361032 A1 | 12/2016 | Carter et al. |
| 2017/0010677 A1 | 1/2017 | Roh et al. |
| 2017/0012925 A1 | 1/2017 | Tekin et al. |
| 2017/0024008 A1 | 1/2017 | Kienzle et al. |
| 2017/0026790 A1 | 1/2017 | Flitsch et al. |
| 2017/0042477 A1 | 2/2017 | Haverinen et al. |
| 2017/0053461 A1 | 2/2017 | Pal et al. |
| 2017/0057492 A1 | 3/2017 | Edgington et al. |
| 2017/0070078 A1 | 3/2017 | Hwang et al. |
| 2017/0075701 A1 | 3/2017 | Ricci et al. |
| 2017/0080952 A1 | 3/2017 | Gupta et al. |
| 2017/0090475 A1 | 3/2017 | Choi et al. |
| 2017/0109512 A1 | 4/2017 | Bower et al. |
| 2017/0129335 A1 | 5/2017 | Lu et al. |
| 2017/0131772 A1 | 5/2017 | Choi |
| 2017/0190121 A1 | 7/2017 | Aggarwal et al. |
| 2017/0242428 A1 | 8/2017 | Pal et al. |
| 2017/0346635 A1 | 11/2017 | Gummeson et al. |
| 2017/0347895 A1 | 12/2017 | Wei et al. |
| 2017/0374074 A1 | 12/2017 | Stuntebeck |
| 2018/0025351 A1 | 1/2018 | Chen et al. |
| 2018/0025430 A1 | 1/2018 | Perl et al. |
| 2018/0032126 A1 | 2/2018 | Liu |
| 2018/0037228 A1 | 2/2018 | Biondo et al. |
| 2018/0039303 A1 | 2/2018 | Hashimoto et al. |
| 2018/0052428 A1 | 2/2018 | Abramov |
| 2018/0054513 A1* | 2/2018 | Ma ..................... H04M 1/67 |
| 2018/0068105 A1 | 3/2018 | Shapiro et al. |
| 2018/0093606 A1 | 4/2018 | Terwilliger et al. |
| 2018/0093672 A1 | 4/2018 | Terwilliger et al. |
| 2018/0115797 A1 | 4/2018 | Wexler et al. |
| 2018/0120892 A1 | 5/2018 | Von et al. |
| 2018/0123629 A1 | 5/2018 | Wetzig |
| 2018/0167200 A1 | 6/2018 | High et al. |
| 2018/0174457 A1 | 6/2018 | Taylor |
| 2018/0178712 A1 | 6/2018 | Terwilliger et al. |
| 2018/0292901 A1 | 10/2018 | Priyantha et al. |
| 2018/0300467 A1 | 10/2018 | Kwong et al. |
| 2018/0322957 A1 | 11/2018 | Pill et al. |
| 2019/0049267 A1 | 2/2019 | Huang |
| 2019/0083022 A1 | 3/2019 | Huang |
| 2019/0131812 A1 | 5/2019 | Lee et al. |
| 2019/0155104 A1 | 5/2019 | Li et al. |
| 2019/0155385 A1 | 5/2019 | Lim et al. |
| 2019/0172289 A1 | 6/2019 | O'Toole et al. |
| 2019/0191998 A1 | 6/2019 | Heikenfeld et al. |
| 2019/0230507 A1* | 7/2019 | Li ....................... H04W 12/06 |
| 2019/0265868 A1 | 8/2019 | Penilla et al. |
| 2019/0286921 A1 | 9/2019 | Law et al. |
| 2019/0287083 A1 | 9/2019 | Wurmfeld et al. |
| 2019/0298173 A1 | 10/2019 | Lawrence et al. |
| 2019/0332140 A1 | 10/2019 | Wang et al. |
| 2019/0342329 A1* | 11/2019 | Turgeman ............. H04L 67/306 |
| 2019/0357834 A1 | 11/2019 | Aarts et al. |
| 2020/0005791 A1 | 1/2020 | Rakshit et al. |
| 2020/0070840 A1 | 3/2020 | Gunaratne |
| 2020/0218238 A1 | 7/2020 | Wang |
| 2020/0356652 A1* | 11/2020 | Yamaguchi ............. H04W 4/80 |
| 2020/0391696 A1 | 12/2020 | Kato et al. |
| 2021/0019731 A1* | 1/2021 | Rule ..................... G06Q 20/10 |
| 2021/0029112 A1 | 1/2021 | Palle et al. |

(56) References Cited

U.S. PATENT DOCUMENTS

| | | |
|---|---|---|
| 2021/0197849 A1 | 7/2021 | Tsuji |
| 2021/0382684 A1 | 12/2021 | Hachiya et al. |
| 2022/0083149 A1 | 3/2022 | Keller et al. |
| 2022/0320899 A1 | 10/2022 | Sanchez et al. |
| 2023/0027131 A1 | 1/2023 | Sanchez et al. |

FOREIGN PATENT DOCUMENTS

| | | |
|---|---|---|
| CN | 106360895 A | 2/2017 |
| CN | 206213423 U | 6/2017 |
| CN | 206333477 U | 7/2017 |
| CN | 206371611 U | 8/2017 |
| CN | 107139933 A | 9/2017 |
| CN | 107260139 A | 10/2017 |
| CN | 108900691 A | 11/2018 |
| CN | 108926081 A | 12/2018 |
| DE | 102015006677 A1 | 11/2016 |
| DE | 102019116618 A1 | 12/2020 |
| EP | 2581856 A1 | 4/2013 |
| KR | 10-2017-0087113 A | 7/2017 |
| WO | 2015/077418 A1 | 5/2015 |
| WO | 2017/136940 A1 | 8/2017 |
| WO | 2018/000396 A1 | 1/2018 |
| WO | 2018/154341 A1 | 8/2018 |
| WO | 2018/204811 A1 | 11/2018 |
| WO | 2019/082095 A1 | 5/2019 |
| WO | 2019/140528 A1 | 7/2019 |
| WO | 2019/180626 A1 | 9/2019 |

OTHER PUBLICATIONS

"Vauxhall/Opel In-Car Wireless Charging", retrieved from <https://www.air-charge.com/aircharge-for-business/automotive/vauxhall-wireless-charging>, Oct. 2019, 4 pages.

"Wireless charging for smart ring/pointing devices" available online at <http://www.humavox.com/smt_product/wireless-charging-for-smart-ringpointing-devices/>, Oct. 2019, 3 pages.

ASU projection wearable: Live tomorrow today (world first launch @ CES 2016). (Dec. 2015). ASU Tech, YouTube. Retrieved from https://www.youtube.com/watch?v=Wdb50-D7YOY.

Brownell, L., "Low-cost wearables manufactured by hybrid 3D printing. Wyss Institute, Harvard," Retrieved from https://wyss.harvard.edu/news/low-cost-wearables-manufactured-by-hybrid-3d-printing/, Sep. 6, 2017, pp. 11.

Cetin, C., "Design, testing and implementation of a new authentication method using multiple devices," Graduate Theses and Dissertations, University of South Florida Scholar Commons. Retrieved from http://scholarcommons.usf.edu/etd/5660, Jan. 2015, pp. 61.

Charles Q. Choi, "Low Battery? New Tech Lets You Wirelessly Share Power", available online at <https://www.livescience.com/54790-new-tech-enables-wireless-charging.html>, May 19, 2016, 9 pages.

Chen, X. A., et al., "Encore: 3D printed augmentation of everyday objects with printed-over, affixed and interlocked attachments," Nov. 5, 2015, pp. 73-82.

Chen, X. A., et al., "Reprise: A design tool for specifying, generating, and customizing 3D printable adaptations on everyday objects," Oct. 16, 2016, pp. 29-39.

E-Senses, "Personal vitamin D, sunlight and daylight coach", available online at <https://e-senses.com/>, 2019, 5 pages.

Hipolite, W., "The 3D printed ÓBluetooth Ring is one of the tiniest personal computers you will ever see," 3DPrint.com. Retrieved from https://3dprint.com/34627/o-bluetooth-ring-3d-printed/, Jan. 2015, pp. 5.

Hussain Almossawi, "This smart ring aims to provide better lives for people with sickle cell disease", retrieved from <https://www.core77.com/projects/82131/This-Smart-Ring-Aims-to-Provide-Better-Lives-for-People-with-Sickle-Cell- Disease>, 2021, 9 pages.

Je et al., "PokeRing: Notifications by poking around the finger", Proceedings of the 2018 CHI Conference on Human Factors in Computing Systems - CHI'18, 2018, paper 542, pp. 1-10.

Katharine Schwab, "Orii, the ring that turns your finger into a phone, is here", available online at < https://www.fastcompany.com/90399237/orii-the-ring-that-turns-your-finger-into-a-phone-is-here >, 2019, 4 pages.

Magno et al., "Self-sustainable smart ring for long-term monitoring of blood oxygenation", IEEE Access, 2019, pp. 115400-115408.

Mahmud et al., "Wearable technology for drug abuse detection: A survey of recent advancements", Smart Health, vol. 13, Aug. 2019, 100062.

Margaret, "The Orb: A Bluetooth headset that turns into a ring", Gadgets, BornRich, Jun. 2013, available online at <http://www.bornrich.com/the-orb-a-bluetooth-headset-that-turns-into-a-ring.html >.

Nassi et al., "Virtual breathalyzer", Department of Software and Information Systems Engineering, Ben-Gurion University of the Negev, Israel, 2016, 10 pages.

Neev Kiran, "SkinnySensor: Enabling Battery-Less Wearable Sensors Via Intrabody Power Transfer", Masters Theses 694, University of Massachusetts Amherst, 2018, 63 pages.

Nerd-Fu, "Push present", Delicious Juice Dot Com, Apr. 2015, available online at <https://blog.deliciousjuice.com/2015/04/ >.

Pablo E Suarez, "NXT Ring—Your Digital-self at Hand", available online at <https://www.youtube.com/watch?v=9w7uxDHs7NY>, uploaded on Jun. 21, 2019, 2 pages.

Roumen et al., "NotiRing: A comparative study of notification channels for wearable interactive rings", Proceedings of the 33rd Annual ACM Conference on Human Factors in Computing Systems - CHI'15, 2015, pp. 2497-2500.

Sarah Jacobsson Purewal, "Ringly review: The smart ring that could be sexier", available online at <https://www.macworld.com/article/227133/ringly-review-the-smart-ring-that-could-be-sexier.html>, 2016, 10 pages.

Schwab, K., "This startup wants to kill passwords-and replace them with jewelry. Fast Company, " Retrieved from https://www.fastcompany.com/90254843/this-startup-wants-to-kill-passwords-and-replace-them-with-jewelry, (Oct. 2018), pp. 7.

Seung et al., "Nanopatterned Textile-Based Wearable Triboelectric Nanogenerator", ACS Nano, vol. 9, 2015, pp. 3501-3509.

Shane McGlaun, "Geek builds Bluetooth Smart Ring with OLED display", available online at <https://www.slashgear.com/geek-builds-bluetooth-smart-ring-with-oled-display-02361383/>, 2015, 6 pages.

Sperlazza, "We tested four sleep tracker apps and wearables: Here are the best ones", available online at <https://www.bulletproof.com/sleep/tech/best-sleep-tracker-apps/>, 2019, 18 pages.

Turunen, "Smart ring for stress control and self-understanding", available online at <https://slowfinland.fi/en/smart-ring-for-stress-control-and-self-understanding/>, 2017, 9 pages.

Wochit Tech. (2017). New smart ring monitors UV exposure [Video file]. Retrieved from https://www.youtube.com/watch?v=4YvkioTZxjU, 3 pages.

Worgan et al., "Garment level power distribution for wearables using inductive power transfer", 9th International Conference on Human System Interactions (HSI), 2016, pp. 277-283.

Xiao et al., "LumiWatch: On-arm projected graphics and touch input", Proceedings of the 2018 CHI Conference on Human Factors in Computing Systems—CHI'18, 2018, pp. 1-11.

Zhu et al., "Developing a driving fatigue detection system using physiological sensors", Proceedings of the 29th Australian Conference on Computer-Human Interaction—OZCHI '17, 2017, pp. 566-570.

Zhu, M. et al. "Fluidic fabric muscle sheets for wearable and soft robotics," Retrieved from https://arxiv.org/pdf/1903.08253.pdf, Mar. 2019, pp. 32.

https://en.wikipedia.org/w/index.php?title=Ring_size&oldid=891328817 (Year: 2019).

Mario, https://www.smartringnews.com/posts/smart-ring-vs-smartwatch-which-is-the-best-fitness-and-activity-tracker (Year: 2014).

Google translation of KR20170087113A (Year: 2016).

Adafruit.com, "RFID/NFC Smart Ring—Size 12—NTAG213", Accessed at: https://web.archive.org/web/20190605061438/https://www.adafruit.com/product/2806, publication Jun. 5, 2019 (Year: 2019).

(56) References Cited

OTHER PUBLICATIONS

Adafruit, p. 1-2, available at: https://www.adafruit.com/product/2806, published Jun. 2019 (Year: 2019).

Laput et al., "Skin buttons: cheap, small, low-powered and clickable fixed-icon laser projectors", UIST '14: Proceedings of the 27th annual ACM symposium on User interface software and technology, Oct. 2014 pp. 389-394.

\* cited by examiner

GESTURE AUTHENTICATION USING A SMART RING

CROSS-REFERENCES TO RELATED APPLICATIONS

This application claims priority to U.S. Provisional Patent Application No. 62/877,391, filed Jul. 23, 2019, and U.S. Provisional Patent Application No. 62/980,726, filed Feb. 24, 2020, both incorporated by reference herein for all purposes.

FIELD OF THE DISCLOSURE

The present disclosure generally relates to implementations of smart ring wearable devices and, more particularly, to authentication techniques using smart ring wearable devices.

BACKGROUND

To obtain authorization to access digital and physical resources, a person generally must provide a security system with an identity. The security system also typically needs some form of authentication from the person in order to ensure that the person actually matches their professed identity. Three common forms of authentication include: something the person knows (e.g., a password), something the person has (e.g., a key, card, or token generator), or something the person is (e.g., biometrics such as a fingerprint). These forms of authentication can be combined to enable multi-factor authentication.

Conventional security devices used to facilitate authentication, such as keys, cards, and smartphones, can easily be stolen or misplaced. On the other hand, more permanent solutions such as chip implants and tattoos are invasive and hard to upgrade and/or replace. Further, often these devices only support one form of authentication and their capabilities are not flexible enough to accommodate different combinations of multi-factor authentication.

As one example, a keycard for unlocking access to a resource may serve as an authentication device. The keycard as something a person possesses that demonstrates that the person is authorized to access the resource. The person demonstrates possession to a security device, such as a lock, by placing the keycard in proximity or contact with the security device. However, if the keycard is stolen, nothing prevents the thief from using the keycard. Further, the form factor of the keycard (and other conventional security keys) is generally not conducive to collecting a wide variety of other information that could support additional authentication forms for multi-factor authentication.

BRIEF SUMMARY

The authentication techniques and devices described below address many problems with conventional security devices and techniques. The described authentication techniques utilize a smart ring as an authentication device that is portable, easy to keep on the person, and able to support multi-factor authentication. A smart ring can easily and inconspicuously be worn by a person wherever they go. Moreover, a smart ring can support many individual authentication forms and combinations of authentication forms that conventional security devices cannot. Because the smart ring is worn on a person's hand, the smart ring can capture a variety of biometric data, subtle gestures, and proximity effects with other devices such as other rings. The person can move and perform gestures freely, without needing to carry a separate authentication device.

This summary is provided to introduce a selection of concepts that are further described below in the detailed description. Certain embodiments may include features and advantages not described in this summary. Further certain embodiments may omit one or more (or all) of the features and advantages described in this summary.

One example embodiment is a method performed by a smart ring for enabling multi-factor authentication. The method comprises performing a first authentication operation by (i) collecting, by one or more sensors of the smart ring, gestural data representing a candidate gesture and a first authentication factor, wherein the candidate gesture corresponds to ring movement while a particular user is wearing the smart ring on a finger of the particular user, wherein the gestural data includes motion data and orientation data; (ii) comparing the candidate gesture to a known authentication gesture for a known user to determine whether the candidate gesture matches the known authentication gesture; (iii) when the candidate gesture matches the known authentication gesture, generating a first signal indicating that the particular user has been identified and authenticated as the known user based at least in part upon the first authentication factor; and (iv) transmitting the first signal to a second device, wherein the second device controls access to a resource. The method also includes performing a second authentication operation by (i) detecting, by the one or more sensors of the smart ring, contact between the smart ring and a component external to the smart ring, wherein the detected contact represents a second authentication factor; (ii) generating, in response to detecting the contact between the smart ring and the component, a second signal indicating that the particular user has been identified and authenticated as the known user based at least in part upon the second authentication factor; and (iii) transmitting the second signal to the second device. Further, the method includes, when the second device receives the first and the second signals, causing the second device to grant the particular user access to the resource in response to determining that the first and second signals indicate that the particular user has been authenticated based at least in part upon both the first and second authentication factors.

An additional embodiment is a smart ring for enabling multi-factor authentication. The smart ring comprises a housing configured to be worn by a user on a finger of the user, one or more sensors, and a processor. The processor may be configured to perform a first authentication operation by (i) collecting, by one or more sensors of the smart ring, gestural data representing a candidate gesture and a first authentication factor, wherein the candidate gesture corresponds to ring movement while a particular user is wearing the smart ring on a finger of the particular user, wherein the gestural data includes motion data and orientation data; (ii) comparing the candidate gesture to an authentication gesture for a known user to determine whether the candidate gesture matches the known authentication gesture; (iii) when the candidate gesture matches the known authentication gesture, generating a first signal indicating that the particular user has been identified and authenticated as the known user based at least in part upon the first authentication factor; and (iv) transmitting the first signal to a second device, wherein the second device controls access to a resource. The processor is further configured to perform a second authentication operation by (i) detecting, by the one or more sensors of the smart ring, contact between the smart ring and a component external to the smart ring, wherein the detected contact represents a second authentication factor; (ii) generating, in response to detecting the contact between the smart ring and the component, a second signal indicating that the particular user has been identified and authenticated as the known user based at least in part upon the second authentication factor; and (iii) transmitting the second signal to the second device. Further, the processor is also configured to, when the second device receives the first and the second signals, cause the second device to grant the particular user access to the resource in response to determining that the first and second signals indicate that the particular user has been authenticated based at least in part upon both the first and second authentication factors.

Depending upon the embodiment, one or more benefits may be achieved. These benefits and various additional objects, features and advantages of the present disclosure can be fully appreciated with reference to the detailed description and accompanying drawings that follow.

BRIEF DESCRIPTION OF THE DRAWINGS

Each of the figures described below depicts one or more aspects of the disclosed system(s) and/or method(s), according to an embodiment. Wherever possible, the detailed description refers to the reference numerals included in the following figures.

DETAILED DESCRIPTION

Figure 1:
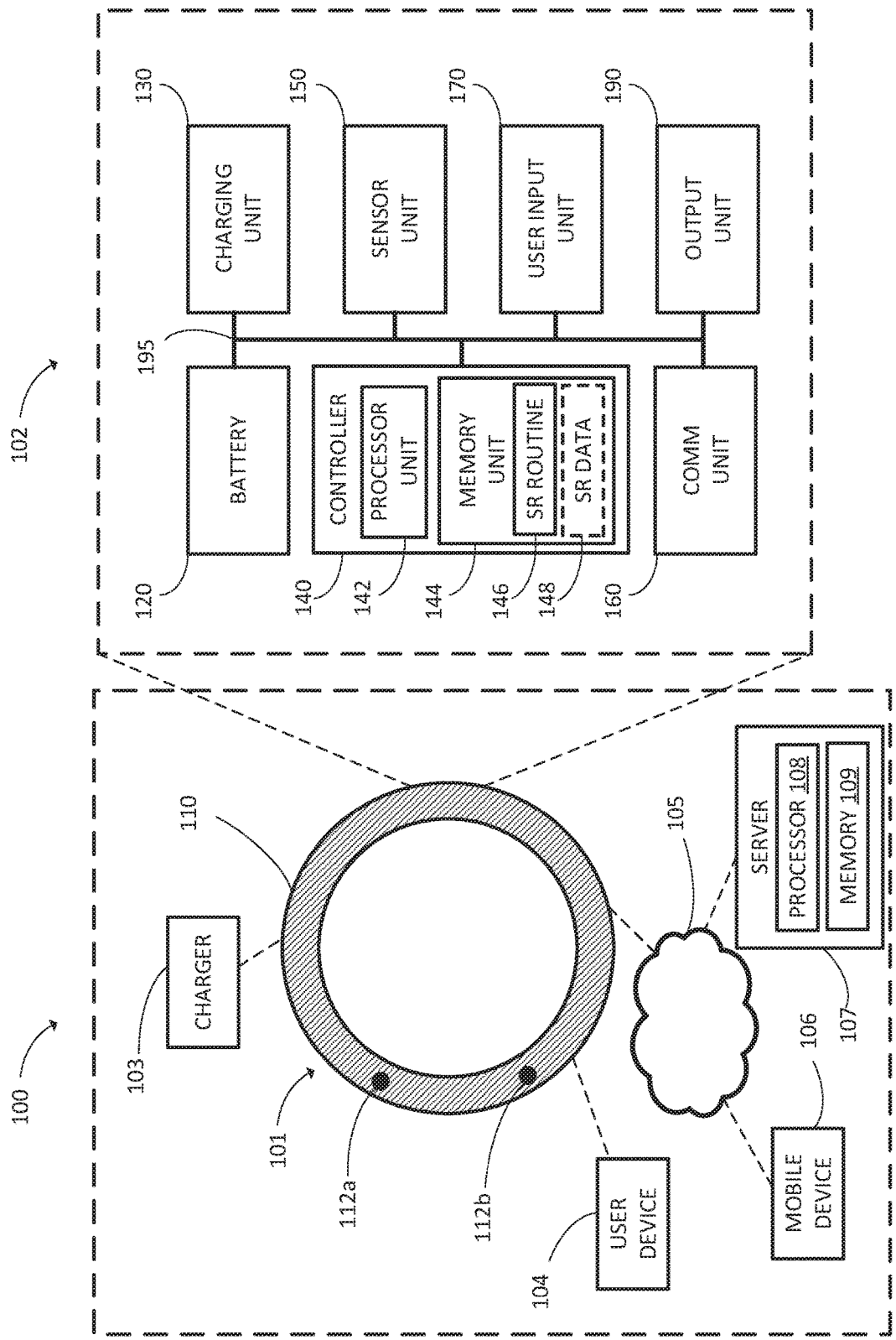
FIG. 1 illustrates a system comprising a smart ring and a block diagram of smart ring components according to some embodiments.

FIG. 1 illustrates a system 100 comprising (i) a smart ring 101 including a set of components 102 and (ii) one or more devices or systems that may be electrically, mechanically, or communicatively connected to the smart ring 101. Specifically, the system 100 may comprise any one or more of: a charger 103 for the smart ring 101, a user device 104, a network 105, a mobile device 106, or a server 107. The charger 103 may provide energy to the smart ring 101 by way of a direct electrical, a wireless, or an optical connection. The smart ring 101 may be in a direct communicative connection with the user device 104, the mobile device 106, or the server 107 by way of the network 105. Interactions between the smart ring 101 and other components of the system 100 are discussed in more detail in the context of FIG. 4.

The smart ring 101 may sense a variety of signals indicative of activities of a user wearing the ring 101, biometric signals, a physiological state of the user, or signals indicative of the user's environment. The smart ring 101 may analyze the sensed signals using built-in computing capabilities or in cooperation with other computing devices (e.g., user device 104, mobile device 106, server 107) and provide feedback to the user or about the user via the smart ring 101 or other devices (e.g., user device 104, mobile device 106, server 107). By analyzing the sensed signals (e.g., representing sensed biometric information such as a heart rate signature or pattern, sensed motion information corresponding to gestures, and sensed proximity or contact information), the smart ring 101 (possibly in cooperation with other computing devices) may identify and authenticate a wearer of the smart ring 101 as a particular known user. In response to authenticating a wearer as a known user, the smart ring 101 may grant access to resources and/or perform certain operations, including cryptographic operations, to be discussed more in detail in the context of FIG. 5, FIG. 6A, FIG. 6B, and FIG. 7. Additionally or alternatively, the smart ring 101 may provide the user with notifications sent by other devices, enable secure access to locations or information, or a variety of other applications pertaining to health, wellness, productivity, or entertainment.

The server 107 may include one processor 108 and at least one non-transitory computer-readable memory 109 storing instructions executable on the processor 108. The server 107 may be an authentication server that supports the smart ring 101's authentication functionalities. For example, the server 107 can store data pertaining to identified users (e.g., wearers) of the smart ring 101. The server 107 may perform data analysis to identify and authenticate users of the smart ring 101 and/or perform operations relating to authentication, as described in further detail with respect to FIG. 5, FIG. 6A, FIG. 6B, and FIG. 7. While not depicted as such in FIG. 1, it is understood that the server 107 may be one of several servers. Further, the server 107 may be implemented as part of a cloud computing service, or may be a node of a decentralized blockchain.

The smart ring 101, which may be referred to herein as the ring 101, may comprise a variety of mechanical, electrical, optical, or any other suitable subsystems, devices, components, or parts disposed within, at, throughout, or in mechanical connection to a housing 110 (which may be ring shaped and generally configured to be worn on a finger). Additionally, a set of interface components 112a and 112b may be disposed at the housing, and, in particular, through the surface of the housing. The interface components 112a and 112b may provide a physical access (e.g., electrical, fluidic, mechanical, or optical) to the components disposed within the housing. The interface components 112a and 112b may exemplify surface elements disposed at the housing. As discussed below, some of the surface elements of the housing may also be parts of the smart ring components.

As shown in FIG. 1, the components 102 of the smart ring 101 may be distributed within, throughout, or on the housing 110. As discussed in the contexts of FIG. 2 and FIG. 3 below, the housing 110 may be configured in a variety of ways and include multiple parts. The smart ring components 102 may, for example, be distributed among the different parts of the housing 110, as described below, and may include surface elements of the housing 110. The housing 110 may include mechanical, electrical, optical, or any other suitable subsystems, devices, components, or parts disposed within or in mechanical connection to the housing 110, including a battery 120, a charging unit 130, a controller 140, a sensor unit 150 comprising one or more sensors, a communications unit 160, a one or more user input devices 170, or a one or more output devices 190. Each of the components 120, 130, 140, 150, 160, 170, and/or 190 may include one or more associated circuits, as well as packaging elements. The components 120, 130, 140, 150, 160, 170, and/or 190 may be electrically or communicatively connected with each other (e.g., via one or more busses or links, power lines, etc.), and may cooperate to enable "smart" functionality described within this disclosure.

The battery 120 may supply energy or power to the controller 140, the sensors 150, the communications unit 160, the user input devices 170, or the output devices 190. In some scenarios or implementations, the battery 120 may supply energy or power to the charging unit 130. The charging unit 130, may supply energy or power to the battery 120. In some implementations, the charging unit 130 may supply (e.g., from the charger 103, or harvested from other sources) energy or power to the controller 140, the sensors 150, the communications unit 160, the user input devices 170, or the output devices 190. In a charging mode of operation of the smart ring 101, the average power supplied by the charging unit 130 to the battery 120 may exceed the average power supplied by the battery 120 to the charging unit 130, resulting in a net transfer of energy from the charging unit 130 to the battery 120. In a non-charging mode of operation, the charging unit 130 may, on average, draw energy from the battery 120.

The battery 120 may include one or more cells that convert chemical, thermal, nuclear or another suitable form of energy into electrical energy to power other components or subsystems 140, 150, 160, 170, and/or 190 of the smart ring 101. The battery 120 may include one or more alkaline, lithium, lithium-ion and or other suitable cells. The battery 120 may include two terminals that, in operation, maintain a substantially fixed voltage of 1.5, 3, 4.5, 6, 9, 12 V or any other suitable terminal voltage between them. When fully charged, the battery 120 may be capable of delivering to power-sinking components an amount of charge, referred to herein as "full charge," without recharging. The full charge of the battery may be 1, 2, 5, 10, 20, 50, 100, 200, 500, 1000, 2000, 5000, 10000, 20000 mAh or any other suitable charge that can be delivered to one or more power-consuming loads as electrical current.

The battery 120 may include a charge-storage device, such as, for example a capacitor or a super-capacitor. In some implementations discussed below, the battery 120 may be entirely composed of one or more capacitive or charge-storage elements. The charge storage device may be capable of delivering higher currents than the energy-conversion cells included in the battery 120. Furthermore, the charge storage device may maintain voltage available to the components or subsystems 130, 140, 150, 160, 170, and/or 190 when one or more cells of the battery 120 are removed to be subsequently replaced by other cells.

The charging unit 130 may be configured to replenish the charge supplied by the battery 120 to power-sinking components or subsystems (e.g., one or more of subsystems 130, 140, 150, 160, 170, and/or 190) or, more specifically, by their associated circuits. To replenish the battery charge, the charging unit 130 may convert one form of electrical energy into another form of electrical energy. More specifically, the charging unit 130 may convert alternating current (AC) to direct current (DC), may perform frequency conversions of current or voltage waveforms, or may convert energy stored in static electric fields or static magnetic fields into direct current. Additionally or alternatively, the charging unit 130 may harvest energy from radiating or evanescent electromagnetic fields (including optical radiation) and convert it into the charge stored in the battery 120. Furthermore, the charging unit 130 may convert non-electrical energy into electrical energy. For example, the charging unit 130 may harvest energy from motion, or from thermal gradients.

The controller 140 may include a processor unit 142 and a memory unit 144. The processor unit 142 may include one or more processors, such as a microprocessor (µP), a digital signal processor (DSP), a central processing unit (CPU), a graphical processing unit (GPU), a field-programmable gate array (FPGA), an application-specific integrated circuit (ASIC), or any other suitable electronic processing components. Additionally or alternatively, the processor unit 142 may include photonic processing components.

The memory unit 144 may include one or more computer memory devices or components, such as one or more registers, RAM, ROM, EEPROM, or on-board flash memory. The memory unit 144 may use magnetic, optical, electronic, spintronic, or any other suitable storage technology. In some implementations, at least some of the functionality the memory unit 144 may be integrated in an ASIC or and FPGA. Furthermore, the memory unit 144 may be integrated into the same chip as the processor unit 142 and the chip, in some implementations, may be an ASIC or an FPGA.

The memory unit 144 may store a smart ring (SR) routine 146 with a set of instructions, that, when executed by the processor 142 may enable the operation and the functionality described in more detail below. Furthermore, the memory unit 144 may store smart ring (SR) data 148, which may include (i) input data used by one or more of the components 102 (e.g., by the controller when implementing the SR routine 146) or (ii) output data generated by one or more of the components 102 (e.g., the controller 140, the sensor unit 150, the communication unit 160, or the user input unit 170). In some implementations, other units, components, or devices may generate data (e.g., diagnostic data) for storing in the memory unit 144.

For example, the memory unit 144 may store sensor data collected by the sensor unit 150. The processor unit 142 may compare sensor data collected at a particular time (e.g., a current heart pattern) to sensor data collected at a previous time (e.g., a previously collected heart pattern or signature) in order to perform various functions. In some implementations, the processor unit 142 may compare sensor data to previously stored sensor data relating to a particular user in order to identify and authenticate the user. In response to authenticating the user, the smart ring 101 may grant the user security access to a digital or physical resource or communicate with another device controlling access to the resource, as discussed in further detail with respect to FIG. 6A, FIG. 6B, and FIG. 7. In some implementations, in response to authenticating the user, the smart ring 101 may perform a cryptographic operation, as discussed in further detail with respect to FIG. 5.

The processing unit 142 may draw power from the battery 120 (or directly from the charging unit 130) to read from the memory unit 144 and to execute instructions contained in the smart ring routine 146. Likewise, the memory unit 144 may draw power from the battery 120 (or directly from the charging unit 130) to maintain the stored data or to enable reading or writing data into the memory unit 144. The processor unit 142, the memory unit 144, or the controller 140 as a whole may be capable of operating in one or more low-power mode. One such low power mode may maintain the machine state of the controller 140 when less than a threshold power is available from the battery 120 or during a charging operation in which one or more battery cells are exchanged.

The controller 140 may receive and process data from the sensors 150, the communications unit 160, or the user input devices 170. The controller 140 may perform computations to generate new data, signals, or information. The controller 140 may send data from the memory unit 144 or the generated data to the communication unit 160 or the output devices 190. The electrical signals or waveforms generated by the controller 140 may include digital or analog signals or waveforms. The controller 140 may include electrical or electronic circuits for detecting, transforming (e.g., linearly or non-linearly filtering, amplifying, attenuating), or converting (e.g., digital to analog, analog to digital, rectifying, changing frequency) of analog or digital electrical signals or waveforms.

The sensor unit 150 may include one or more sensors disposed within or throughout the housing 110 of the ring 101. Each of the one or more sensors may transduce one or more of: light, sound, acceleration, translational or rotational movement, strain, temperature, chemical composition, surface conductivity or other suitable signals into electrical or electronic sensors or signals. A sensor may be acoustic, photonic, micro-electro-mechanical systems (MEMS) sensors, chemical, micro-fluidic (e.g., flow sensor), or any other suitable type of sensor.

The sensors included in the sensor unit 150 may be configured to collect biometric data indicative of biometric signatures unique to an individual user (e.g., wearer) of the ring, For example, the sensor unit 150 may include a heart rate sensor capable of measuring a user's heart rate. More particularly, the heart rate sensor can measure the electrical activity of the heart by recording an electrocardiogram (ECG), for example. The heart rate sensor may be comprised of one or more electrodes. The collected ECG pattern can be used to identify and authenticate a user because ECG patterns are unique to individuals, Additionally or alternatively, the sensor unit 150 may include other sensors, such as vibration sensors and accelerometers, capable of measuring heart beat signatures. For example, vibration sensors can detect blood flow patterns and/or chest movement patterns which may be indicative of a particular user. The user may need to hold the smart ring 101 against another body part, such as their chest or another hand/finger in order for the sensor unit 150 to collect the biometric data.

In some implementations, the sensor unit 150 may include sensors such as accelerometers, gyroscopes, magnetometers, and/or IMUs configured to detect a user's walking gait, As individuals walk, the movements of their body generally correspond to a signature pattern unique to each individual. The sensor unit 150 of the smart ring 101 can collect motion and orientation data, and may determine the particular pattern of movements that corresponds to the gait of an individual wearer. Subsequently, this collected data may be compared to one or more verified signatures unique to one or more people in order to identify a signature corresponding to the collected data (and to thereby identify a unique identity corresponding to the collected data).

The sensor unit 150 may collect other biometric data that may be indicative of a user. For example, the sensor unit 150 may include an iris scanner that can collect images of a user's eyes. The smart ring 101 may analyze the images to perform iris recognition to identify a user. As another example, the sensor unit 150 may include a fingerprint scanner that can collect fingerprint data unique to a user. Still further, the sensor unit 150 may include acoustic sensors that can collect sound data, such as a user's voice. The user may speak a password or pass phrase that the smart ring 101 can identify. Additionally or alternatively, the smart ring 101 may perform voice recognition analysis to identify a user. For example, the smart ring 101 may analyze voice parameters, such as pitch, tone, and cadence, to identify the acoustic pattern of the speech.

Further, the sensors included in the sensor unit 150 may be configured to collect data indicative of ring movement while a user is wearing the smart ring 101. For example, the sensor unit 150 may include sensors such as accelerometers, gyroscopes, magnetometers, and/or inertial motion units (IMUs) configured to detect motion and orientation of the smart ring 101. The sensors can detect combinations of motions that correspond to gestures and patterns of movement made by a wearer of the smart ring 101. The sensor unit 150 can be equipped with a timer or clock such that detected movements are accompanied by a time stamp. The smart ring 101 can determine, based at least in part upon the closeness in time of detected motions, that a series of detected movements correspond to a gestural pattern. For example, the sensor unit 150 can detect motion corresponding to gestures such as handshakes, fist bumps, knocks, waves, thumbs-up, pointing, and any other hand motions or signals.

The sensors in the sensor unit 150 may include tactile sensors that can detect when the smart ring 101, or when a portion of the smart ring 101 housing including the tactile sensor, comes into contact with another object or device. Examples of tactile sensors include piezoresistive, piezoelectric, capacitive, and elastoresistive sensors. For instance, the tactile sensors may be pressure sensors or strain sensors that can detect when force is applied to the tactile sensor. Similar to how the smart ring 101 can determine, based at least in part upon the closeness in time of detected motions, that a series of detected motion corresponds to a gestural pattern, the smart ring 101 can also determine, based at least in part upon the closeness in time of detected contact, that the contact corresponds to a pattern. For example, the smart ring 101 may detect a sequence of taps (e.g., physical contact between the ring and an object or device) and determine that that the sequence of taps corresponds to a particular pattern of taps. The pattern of taps may be characterized by, for example, an overall number of taps, the time between each tap, the time between a first detected tap and a last detected tap. frequency of taps, tempo of taps, and rhythm of taps.

Other sensors of the smart ring 101 besides tactile sensors may also be able to detect when the smart ring 101 makes contact with another device or object. For example, acceleration and/or vibration sensors of the sensor unit 150 may detect sudden changes in acceleration and/or vibration of the smart ring 101 corresponding to contact.

Sensors included in the sensor unit 150 may also be able to detect contact with a human body part, such as taps made by a human on the smart ring 101 using a finger. In some cases, these sensors may be user input devices within the user input unit 170, discussed further below. For example, the smart ring 101 may include specific buttons or portions of the smart ring 101 housing that can detect tactile user input. The sensors may also be used to determine when human skin makes contact with the smart ring 101 or a portion of the smart ring 101 (e.g., the user input unit 170) by sensing capacitive coupling or body heat.

Still further, sensors of the smart ring 101 may include proximity sensors that can detect when the smart ring 101 is in close proximity to another device. A proximity sensor may also detect contact between the smart ring 101 and another device. For example, if the proximity sensor can detect when the proximity sensor is within a small distance from another device, and if that small distance is on the order of the size of the housing 110, then a proximity event that that the proximity sensor detects may actually correspond to contact between the housing 110 and another device. The proximity sensors may be capacitive, inductive, magnetic, or optical sensors.

As one example, the proximity sensor may detect proximity with another device based at least in part upon short-range communication with the other device. For instance, the smart ring 101 may utilize near field communication (NFC) or other suitable short-range communication standard to detect proximity with another device. The sensor unit 150 (or the communication unit 160, discussed below) may include an active NFC device (e.g., an NFC chip or tag) that transmits electromagnetic signals from the smart ring 101. When in close proximity (e.g., on the order of 10 centimeters or less), another NFC-enabled device can receive the signals and respond with signals that the NFC device of the smart ring 101 can detect. The active NFC device may have different modes that allow it to function either in an active mode (e.g., as a scanner or reader) or in a passive mode (e.g., as a tag). Additionally or alternatively, the sensor unit 150 (or the communication unit 160) may include a passive NFC device that contains user-specific information that may be accessed by authorized readers. Signals received from an external device may include information including an identifier of the external device, and the smart ring 101 itself may transmit signals including an identifier of the smart ring 101 (e.g., to demonstrate the presence of the smart ring 101 for authentication purposes). As mentioned above, if the NFC-range of the communication unit 160 is on the order of the dimensions of the housing 110, then detection of NFC communications with another device may actually correspond to physical contact between the smart ring 101 and the other device.

The communication unit 160 may facilitate wired or wireless communication between the ring 101 and one or more other devices, The communication unit 160 may include, for example, a network adaptor to connect to a computer network, and, via the network, to network-connected devices. The computer network may be the Internet or another type of suitable network (e.g., a personal area network (PAN), a local area network (LAN), a metropolitan area network (MAN), a wide area network (WAN), a mobile, a wired or wireless network, a private network, a virtual private network, etc.). The communication unit 160 may use one or more wireless protocols, standards, or technologies for communication, such as Wi-Fi, NFC, Bluetooth, or Bluetooth low energy (BLE). Additionally or alternatively, the communication unit 160 may enable free-space optical or acoustic links. In some implementations, the communication unit 160 may include one or more ports for a wired communication connections. The wired connections used by the wireless communication module 160 may include electrical or optical connections (e.g., fiber-optic, twisted-pair, coaxial cable).

User input unit 170 may collect information from a person wearing the ring 101 or another user, capable of interacting with the ring 101. In some implementations, one or more of the sensors in the sensor unit 150 may act as user input devices within the user input unit 170. User input devices may transduce tactile, acoustic, video, gesture, or any other suitable user input into digital or analog electrical signal, and send these electrical signals to the controller 140.

The output unit 190 may include one or more devices to output information to a user of the ring 101. The one or more output devices may include acoustic devices (e.g., speaker, ultrasonic); haptic (thermal, electrical) devices; electronic displays for optical output, such as an organic light emitting device (OLED) display, a laser unit, a high-power light-emitting device (LED), etc.; or any other suitable types of devices. For example, the output unit 190 may include a projector that projects an image onto a suitable surface. In some implementations, the sensor unit 150, the user input unit 170, and the output unit 190 may cooperate to create a user interface with capabilities (e.g., a keyboard) of much larger computer systems, as described in more detail below.

Devices external to the smart ring 101 may support the user input and/or output functionalities of the smart ring 101. For example, in some implementations, the smart ring 101 may receive user input and/or output information to a user through a communicative connection with another device, such as the user device 104 or the mobile device 106. The smart ring 101 may pair with these devices, for example via a Wi-Fi, NFC, Bluetooth, or other suitable wireless or wired communicative connection, and a user may be able to pass information to the smart ring 101 by interacting with the paired device. For instance, the paired device may display a webpage or application associated with the smart ring 101. The user may input information via the webpage or application, and the paired device may communicate this user input to the smart ring 101. When the smart ring 101 has information for the user and/or has a request to display to the user, the smart ring 101 may communicate this information and/or request to the paired device, and the paired device may output the information and/or request to the user.

The components 120, 130, 140, 150, 160, 170, and/or 190 may be interconnected by a bus 195, which may be implemented using one or more circuit board traces, wires, or other electrical, optoelectronic, or optical connections. The bus 195 may be a collection of electrical power or communicative interconnections. The communicative interconnections may be configured to carry signals that conform to any one or more of a variety of protocols, such as I2C, SPI, or other logic to enable cooperation of the various components.

Figure 2:
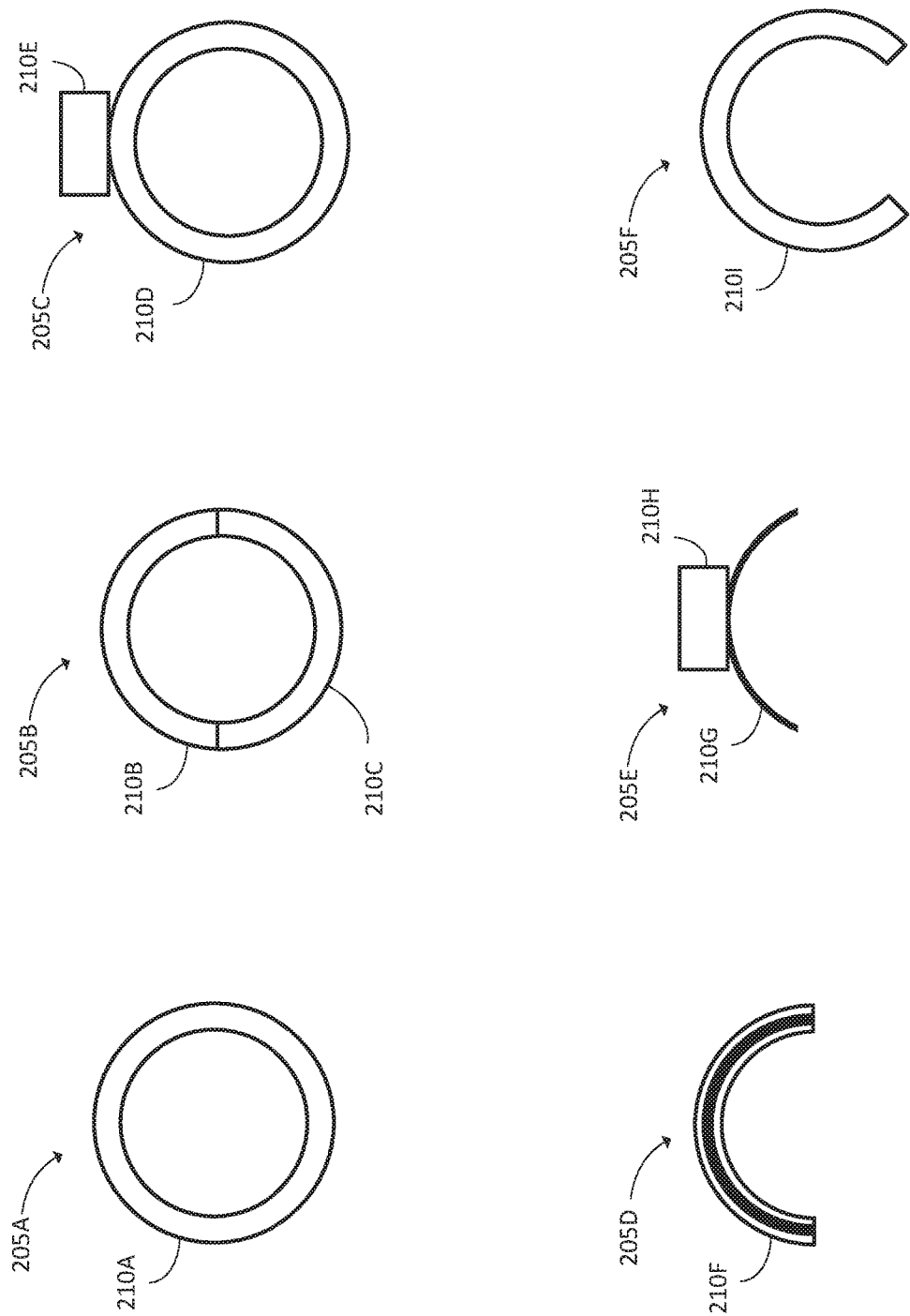
FIG. 2 illustrates a number of different form factor types of a smart ring according to some embodiments.

FIG. 2 includes block diagrams of a number of different example form factor types or configurations 205a, 205b, 205c, 205d, 205e, and/or 205f of a smart ring (e.g., the smart ring 101). The configurations 205a, 205b, 205c, 205d, 205e, and/or 205f (which may also be referred to as the smart rings 205a, 205b, 205c, 205d, 205e, and/or 205f) may each represent an implementation of the smart ring 101, and each may include any one or more of the components 102 (or components similar to the components 102). In some embodiments, one or more of the components 102 may not be included in the configurations 205a, 205b, 205c, 205d, 205e, and/or 205f. The configurations 205a, 205b, 205c, 205d, 205e, and/or 205f include housings 210a, 210b, 210c, 210d, 210e, and/or 210f, which may be similar to the housing 110 shown in FIG. 1.

The configuration 205a may be referred to as a band-only configuration comprising a housing 210a. In the configuration 205b, a band may include two or more removably connected parts, such as the housing parts 210b and 210c. The two housing parts 210b and 210c may each house at least some of the components 102, distributed between the housing parks 210b and 210c in any suitable manner.

The configuration 205c may be referred to as a band-and-platform configuration comprising (i) a housing component 210d and (ii) a housing component 210e (sometimes called the "platform 210e"), which may be in a fixed or removable mechanical connection with the housing 210d. The platform 210e may function as a mount for a "jewel" or for any other suitable attachment. The housing component 210d and the platform 210e may each house at least one or more of the components 102 (or similar components).

In some instances, the term "smart ring" may refer to a partial ring that houses one or more components (e.g., components 102) that enable the smart ring functionality described herein. The configurations 205d and 205e may be characterized as "partial" smart rings, and may be configured for attachment to a second ring. The second ring may be a conventional ring without smart functionality, or may be second smart ring, wherein some smart functionality of the first or second rings may be enhanced by the attachment.

The configuration 205d, for example, may include a housing 210f with a groove to enable clipping onto a conventional ring. The grooved clip-on housing 210f may house the smart ring components described above. The configuration 205e may clip onto a conventional ring using a substantially flat clip 210g part of the housing and contain the smart ring components in a platform 210h part of the housing.

The configuration 205f, on the other hand, may be configured to be capable of being mounted onto a finger of a user without additional support (e.g., another ring). To that end, the housing 210i of the configuration 205f may be substantially of a partial annular shape subtending between 180 and 360 degrees of a full circumference. When implemented as a partial annular shape, the housing 210i may be more adaptable to fingers of different sizes that a fully annular band (360 degrees), and may be elastic. A restorative force produced by a deformation of the housing 210i may ensure a suitable physical contact with the finger. Additional suitable combinations of configurations (not illustrated) may combine at least some of the housing features discussed above.

Figure 3:
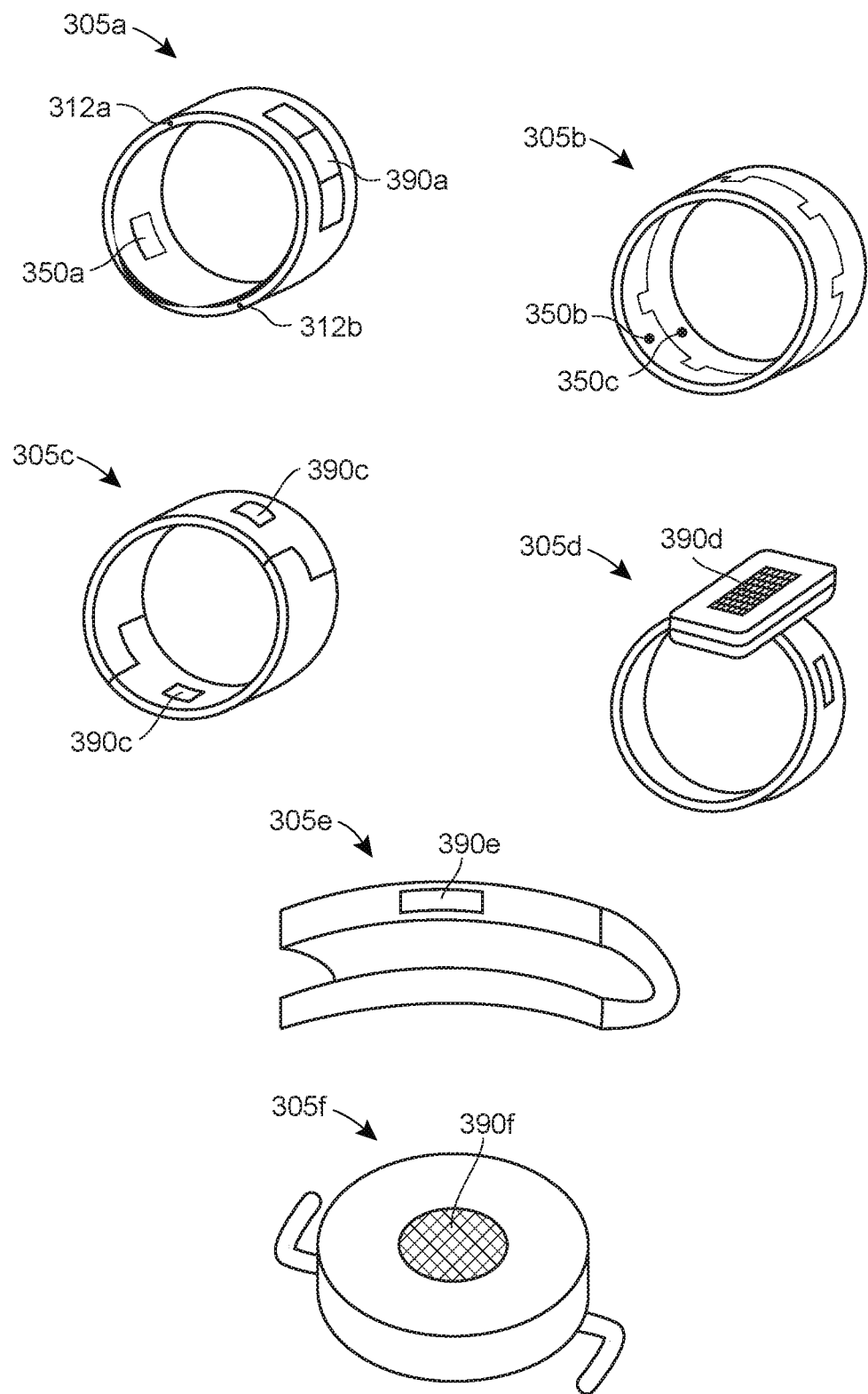
FIG. 3 illustrates examples of different smart ring form factors.

FIG. 3 includes perspective views of example configurations 305a, 305b, 305c, 305d, 305e, and/or 305f of a smart right (e.g., the smart ring 101) in which a number of surface elements are included.

Configuration 305a is an example band configuration 205a of a smart ring (e.g., smart ring 101). Some of the surface elements of the housing may include interfaces 312a, 312b that may be electrically connected to, for example, the charging unit 130 or the communications unit 160. On the outside of the configuration 305a, the interfaces 312a, 312b may be electrically or optically connected with a charger to transfer energy from the charger to a battery (e.g., the battery 120), or with another device to transfer data to or from the ring 305a. The outer surface of the configuration 305a may include a display 390a, while the inner surface may include a biometric sensor 350a.

The configurations 305b and 305c are examples of configurations of a smart ring with multiple housing parts (e.g., configuration 205b in FIG. 2). Two (or more) parts may be separate axially (configuration 305b), azimuthally (configuration 305c), or radially (nested rings, not shown). The parts may be connected mechanically, electrically, or optically via, for example, interfaces analogous to interfaces 312a, 312b in configuration 305a. Each part of a smart ring housing may have one or more surface elements, such as, for example, sensors 350b, 350c or output elements 390b, 390c. The latter may be LEDs (e.g., output element 390b) or haptic feedback devices (e.g., output element 390c), among other suitable sensor or output devices. Additionally or alternatively, at least some of the surface elements (e.g., microphones, touch sensors) may belong to the user input unit 170.

Configuration 305d may be an example of a band and platform configuration (e.g., configuration 205c), while configurations 305e and 305f may be examples of the partial ring configurations 205d and 205e, respectively. Output devices 390d, 390e, and 390f on the corresponding configurations 305d, 305e, and 305f may be LCD display, OLED displays, e-ink displays, one or more LED pixels, speakers, or any other suitable output devices that may be a part of a suite of outputs represented by an output unit (e.g., output unit 190). Other surface elements, such as an interface component 312c may be disposed within, at, or through the housing. It should be appreciated that a variety of suitable surface elements may be disposed at the illustrated configurations 305a, 305b, 305c, 305d, 305e, and/or 305f at largely interchangeable locations. For example, the output elements 390d, 390e, and 390f may be replaced with sensors (e.g., UV sensor, ambient light or noise sensors, etc.), user input devices (e.g., buttons, microphones, etc.), interfaces (e.g., including patch antennas or optoelectronic components communicatively connected to communications units), or other suitable surface elements.

Figure 4:
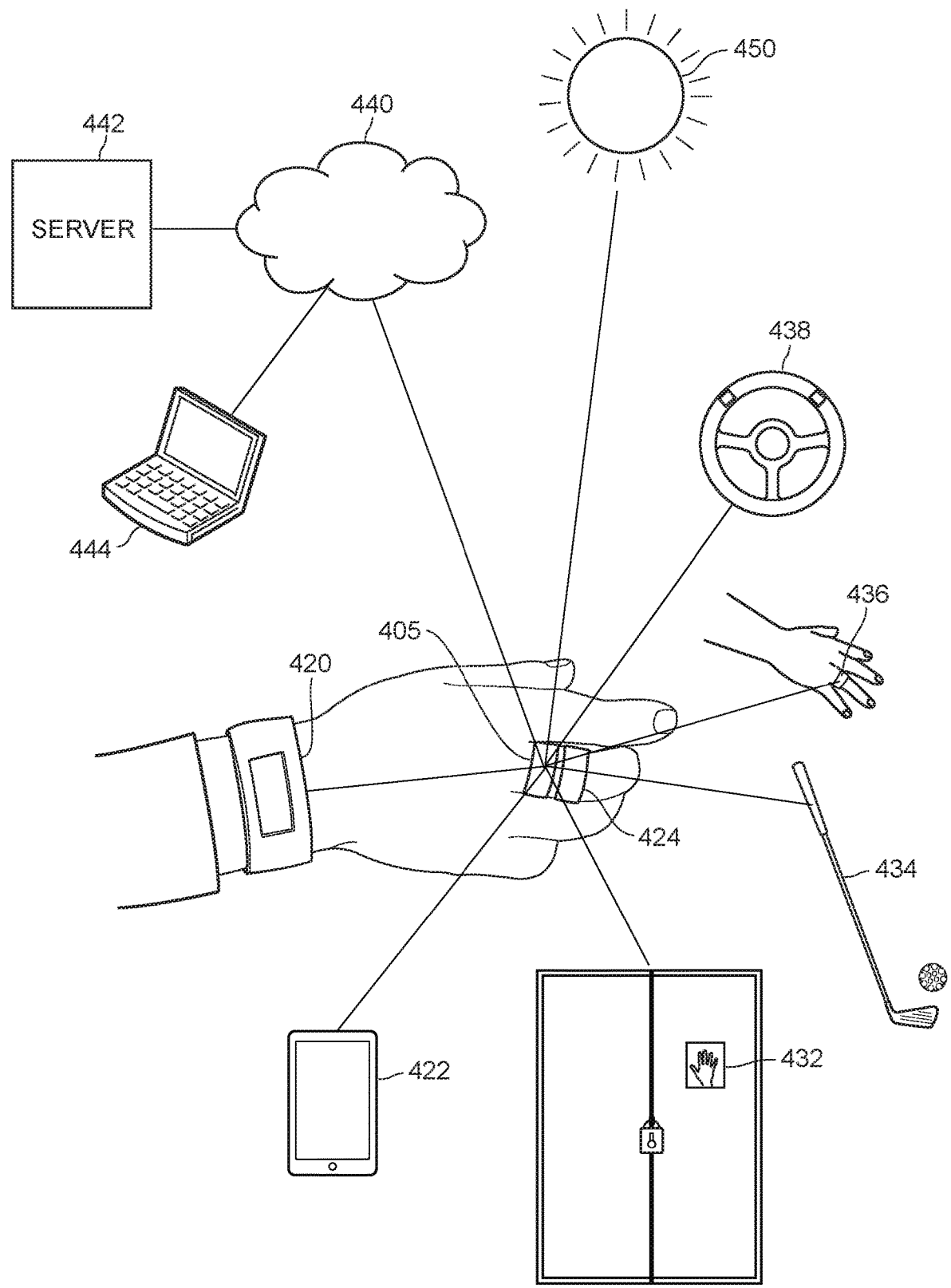
FIG. 4 illustrates an environment within which a smart ring may operate according to some embodiments.

FIG. 4 illustrates an example environment 400 within which a smart ring 405 may be configured to operate. In an embodiment, the smart ring 405 may be the smart ring 101. In some embodiments, the smart ring 405 may be any suitable smart ring capable of providing at least some of the functionality described herein. Depending on the embodiment, the smart ring 405 may be configured in a manner similar or equivalent to any of the configurations 205a, 205b, 205c, 205d, 205e, and/or 205f or 305a, 305b, 305c, 305d, 305e, and/or 305f shown in FIG. 2 and FIG. 3.

The smart ring 405 may interact (e.g., by sensing, sending data, receiving data, receiving energy) with a variety of devices, such as bracelet 420 or another suitable wearable device, a mobile device 422 (e.g., a smart phone, a tablet, etc.) that may be, for example, the user device 104, another ring 424 (e.g., another smart ring, a charger for the smart ring 405, etc.), a secure access panel 432, a golf club 434 (or another recreational accessory), a smart ring 436 worn by another user, or a steering wheel 438 (or another vehicle interface). Additionally or alternatively, the smart ring 405 may be communicatively connected to a network 440 (e.g., WiFi, 5G cellular), and by way of the network 440 (e.g., network 105 in FIG. 1) to a server 442 (e.g., server 107 in FIG. 1) or a personal computer 444 (e.g., mobile device 106). Additionally or alternatively, the ring 405 may be configured to sense or harvest energy from natural environment, such as the sun 450.

The secure access panel 432, for example, may control access to a resource. The smart ring 101 may interact with the secure access panel 432 in order to cause the secure access panel 432 to grant the wearer and/or the smart ring 101 access to the resource. For example, the secure access panel 432 may include a lock that controls access to a physical resource or physical space such as a home, room, vehicle, safe, etc.

The ring 405 may exchange data with other devices by communicatively connecting to the other devices using, for example, the communication unit 160. The communicative connection to other device may be initiated by the ring 405 in response to user input via the user input unit 170, in response to detecting trigger conditions using the sensor unit 150, or may be initiated by the other devices. The communicative connection may be wireless, wired electrical connection, or optical. In some implementation, establishing a communicative link may include establishing a mechanical connection.

The ring 405 may connect to other devices (e.g., a device with the charger 103 built in) to charge the battery 120. The connection to other devices for charging may enable the ring 405 to be recharged without the need for removing the ring 405 from the finger. For example, the bracelet 420 may include an energy source that may transfer the energy from the energy source to battery 120 of the ring 405 via the charging unit 430. To that end, an electrical (or optical) cable may extend from the bracelet 420 to an interface (e.g., interfaces 112a, 112b, 312a, 312b) disposed at the housing (e.g., housings 110, 210a-i) of the ring 405. The mobile device 422, the ring 424, the golf club 434, the steering wheel 438 may also include energy source configured as chargers (e.g., the charger 103) for the ring 405. The chargers for may transfer energy to the ring 405 via a wired or wireless (e.g., inductive coupling) connection with the charging unit 130 of the ring 405.

Examples of Security Implementations

The smart ring 101 may be used to perform a variety of security-related functions. Within the general category of security are three-interrelated concepts: identification, authentication, and authorization. As will be described herein, the smart ring 101 can perform functions related to each of these three concepts. Identification relates to determining who a user is, e.g., to answering the question, "Who are you?" As an example, a user of a computing system may provide a username that indicates an identity of the user. Authentication relates to determining whether the user is who the user said to be. Continuing with the previous example, a user of a computing system may provide a password associated with the username that proves the user is indeed the user associated with the username. Authorization relates to granting a user access to a resource and/or performing a function a user has requested in response to the user being both (1) identified and (2) authenticated.

Authentication may be based at least in part upon one or more factors. Example authentication factors include: knowledge factors (e.g., something a user knows, such as a password or personal identification number (PIN)), possession factors (e.g., something a user has, such as a physical key or card, or a token device that produces temporary passwords or PINs), or inherence factors (e.g.; something a user is, such as a biometric signature of the user). Multi-factor authentication relies on a combination of multiple authentication factors. In the context of the present disclosure, the smart ring 101 may support authentication factors within all three categories (knowledge, possession, and inherence), as will be discussed with reference to Figure FIG. 6A, FIG. 6B, and FIG. 7. As a first example, the smart ring 101 may collect biometric data that facilitates biometric authentication. Further, the smart ring 101 itself may be a token that, if the user demonstrates possession of the smart ring 101, serves as a possession authentication factor. The smart ring 101 can also verify the proximity of other tokens to the smart ring 101. Moreover, the smart ring 101 can collect PINs/passwords from the user, determine gestural patterns performed by the user, and determine contact patterns (e.g., coded knocks) performed by the user, facilitating authentication based at least in part upon knowledge factors.

Figure 5:
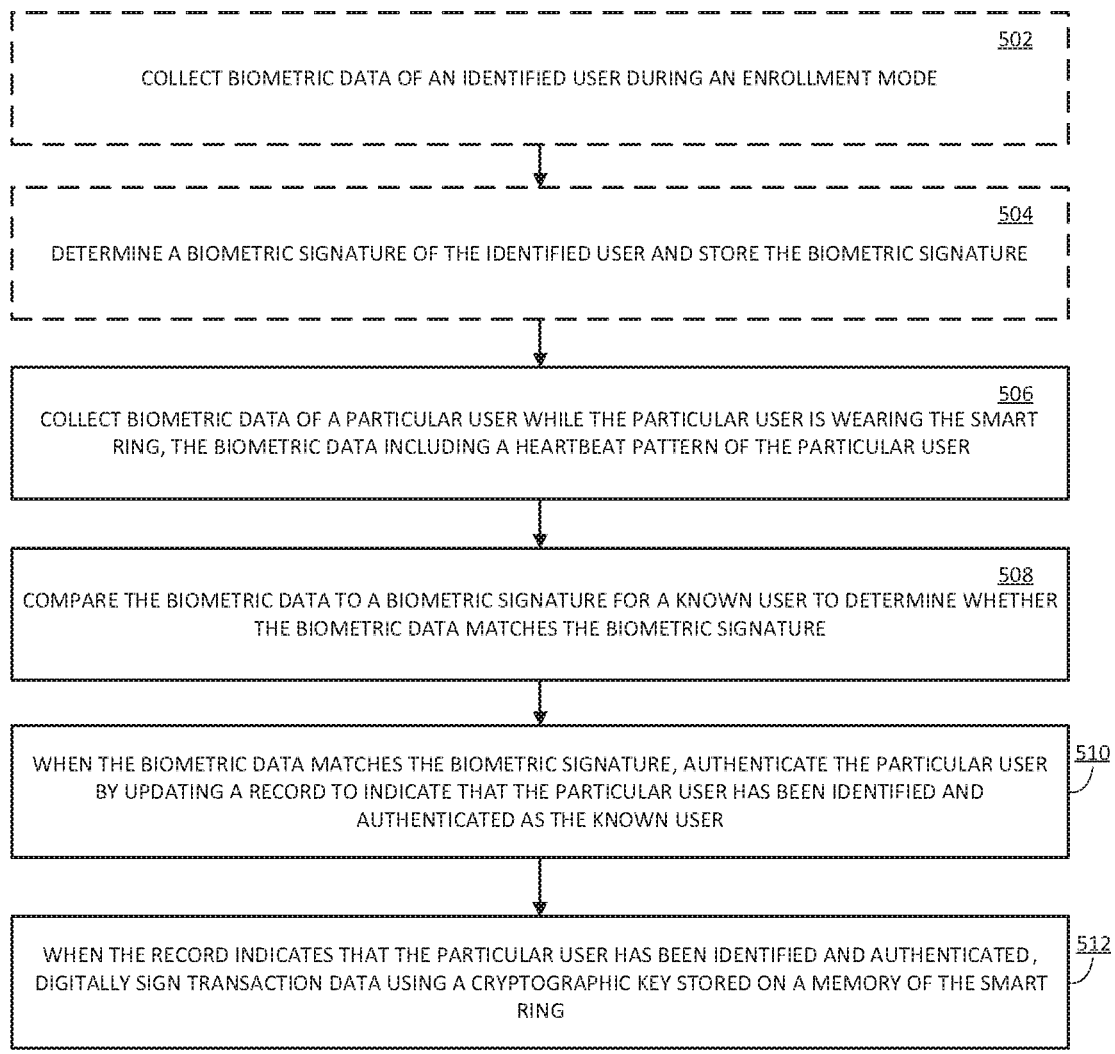
FIG. 5 illustrates an example method for identifying and authenticating a user using biometric data collected by a smart ring according to one embodiment.

FIG. 5 illustrates an example method 500 for identifying and authenticating a user using biometric data collected by the smart ring 101 according to one embodiment. In the example method 500, the smart ring 101 performs an authentication operation using an authentication factor corresponding to biometric data. In some implementations, the method 500 can begin at block 502. In other implementations, the method 500 may begin at block 506.

At block 502, sensors of the smart ring 101 (e.g., sensor unit 150) collect biometric data of a user during an enrollment or set-up mode of the smart ring 101. The smart ring 101 may enter an enrollment mode in order to register a new user to utilize the smart ring 101, or to update a profile of an existing known user of the smart ring 101. During the enrollment mode, a user may provide an identification to the smart ring 101 besides the biometric data, in order for the smart ring 101 to associate the collected biometric data with a particular identity. For instance, the user may set up a profile on the smart ring 101 itself or by pairing the smart ring 101 with another device, such as the mobile device 422 or the mobile device 106. The user may provide a username associated with the user and/or some other suitable form of identification such that the smart ring 101 can associate biometric data collected during the enrollment mode to an identified, known user. As will be described with reference to FIG. 6A, FIG. 6B, and FIG. 7, other data, such as gestural data, proximity data, and contact data, may also be collected during the enrollment mode and associated with an identified, known user.

At block 504, the smart ring 101 determines a biometric signature of the identified user based at least in part upon the biometric data collected during the enrollment mode and stores the biometric signature. The smart ring 101 may determine the biometric signature using the controller 140. Additionally or alternatively, the smart ring 101 may communicate all or a portion of the collected biometric data to the server 107, the user device 104, the mobile device 106, the personal computer 444, or the mobile device 422, which may in turn perform the analysis to determine the biometric signature. In some cases, no processing may be needed to determine the biometric signature; the biometric data may simply be stored as-is (e.g., as collected by the sensor unit 150). In other cases, the analyzing device (whether it is the smart ring 101 or an external device) may determine parameters and/or patterns based at least in part upon the biometric data and assign these parameters and/or patterns as the biometric signature. In any case, the biometric signature is unique to a particular user.

As an example, the smart ring 101 may collect an ECG of the identified user. The analyzing device can determine features of the ECG, such as the types of waves within the ECG (e.g., P, O, R, S, and/or T waves), the locations and intervals among the waves, the amplitude of the waves, the shapes of the waves, the frequency, etc. A set of ECG features for a particular user may be unique when compared to sets of ECG features for other users (thus, the sets of ECG features may function as unique signatures). The specific ECG pattern and/or the identified features of the ECG pattern then can be stored as a biometric signature. Similarly, as another example, the smart ring 101 may collect motion and orientation data while a user walks. The analyzing device may determine that the motion and orientation data correspond to a user walking, and may identify a specific movement pattern within the motion and orientation data corresponding to the user's gait. The specific movement pattern can then be stored as a biometric signature.

Other biometric data that the smart ring 101 can collect and can determine a corresponding biometric signature for include: a fingerprint, an iris scan, or voice data. For instance, the smart ring 101 may identify a specific acoustic pattern associated with the identified user's speech and store this acoustic pattern as a biometric signature.

The analyzing device itself may store the biometric signature. In some implementations, the analyzing device may communicate the biometric signature to the smart ring 101, and the smart ring 101 may store the biometric signature on the memory unit 144. Alternatively or in addition, the analyzing device may communicate the biometric signature to the server 107, which may function as an authentication server, as mentioned previously.

At block 506, sensors of the smart ring 101 collect, outside the enrollment mode, biometric data of a particular user while the particular user is wearing the smart ring. As discussed previously with respect to FIG. 1 and the sensor unit 150, the sensors of the sensor unit 150 can collect a variety of biometric data that may be indicative of a biometric signature, such as heartbeat pattern, walking gait, fingerprint, iris, and/or voice data. In the example method 500, the collected biometric data includes a heartbeat pattern of the user. For example, the heartbeat pattern may be a heart rate (e.g., pulse rate), an ECG, and/or physical movement data corresponding to the heartbeat pattern (e.g., chest vibrations corresponding to a heartbeat pattern, blood flow patterns corresponding to a heartbeat pattern).

The smart ring 101 may constantly collect biometric data in order to determine that the wearer is an authenticated user. The smart ring 101 may collect biometric data at regular periods (e.g., after several seconds, minutes, or hours of wear by a user). Alternatively or additionally, the smart ring 101 may collect biometric data in response to a request from the user to perform an operation or in response to receiving a signal from another device. For example, when the smart ring 101 is brought into proximity with a secure access panel 432 (e.g., proximity close enough for NFC communication), the secure access panel 432 may transmit a signal to the smart ring 101 indicating that the smart ring 101 must provide identification and authentication of the wearer in order to receive authorization to open the secure access panel 432.

As another example, the user may wish to perform a cryptographic operation, as will be discussed in more detail below with reference to block 512. The user may need a cryptographic key stored on the smart ring 101 in order to perform the cryptographic operation. The user may indicate to the smart ring 101 that they wish to perform the cryptographic operation, for example by interacting with the user input unit 170 (e.g., by pressing a button or screen on the smart ring 101 or on a paired device). Following the request, the smart ring 101 performs an authentication operation in order to authenticate the user as an identified user associated with the cryptographic key before releasing the cryptographic key.

At blocks 508 and 510, the smart ring 101 performs an authentication operation by (i) comparing the biometric data to a biometric signature for a known user to determine whether the biometric data matches the biometric signature (block 508), and (ii) when the biometric data matches the biometric signature, authenticating the particular user by updating a record to indicate that the particular user has been identified and authenticated as the known user (block 510).

More particularly, at block 508, the smart ring 101 compares the biometric data collected at block 506 to a biometric signature for a known user to determine whether the biometric data matches the biometric signature. If optional steps 502 and 504 have not been performed, the smart ring 101 may compare the biometric data to biometric signatures included in a general database of biometric signatures for known individuals stored externally, such as at the server 107. In implementations where steps 502 and 504 have been performed, then the biometric data are compared to the biometric signature collected while the smart ring 101 was in an enrollment mode. The biometric signature may be stored at the smart ring 101, such as in the memory unit 144, or may be stored on an external device such as the server 107, the user device 104, the mobile device 106, the personal computer 444, or the mobile device 422. In implementations where the biometric signature is stored at a device external to the smart ring 101, the smart ring 101 may communicate all or a portion of the collected biometric data to the external device in order to facilitate comparison.

The external device or the smart ring 101 then compares the biometric data to the stored biometric signature. The stored biometric signature is associated with a previously identified, known user. If the smart ring 101 causes the external device to perform the comparison, the external device can communicate the results of the comparison to the smart ring 101.

The collected biometric data and the stored biometric signature do not need to match exactly. The smart ring 101 can determine that the collected biometric data and the stored biometric signature match if the two data sets are similar within a tolerance or threshold suitable for the particular biometric application. For instance, the tolerance may be based at least in part upon the uncertainty of the biometric measurement, which may depend on the sensors that collect the biometric data.

As an example, if the collected biometric data include a heartbeat pattern, then the collected heartbeat pattern is compared to a biometric signature, such as a stored ECG or stored features of the ECG. The comparison may be between the collected heartbeat pattern and the stored ECG. Alternatively or in addition, the external device or the smart ring 101 may identify certain features of the heartbeat pattern (e.g., the features of the waves within the ECG, as mentioned previously) and compare these identified features to the stored features of the ECG. If the collected heartbeat pattern matches the biometric signature, or at least matches within a tolerance, then the smart ring 101 determines that the wearer of the ring has the identity associated with the biometric signature and has authenticated the identity by providing the biometric data.

As another example, if the collected biometric data include motion data corresponding to a walking gait, then the motion data are compared to stored walking gait data. The comparison may be between the collected motion data and the stored walking gait data. Alternatively or in addition, the external device or the smart ring 101 may identify certain features of the walking gait (e.g., a specific pattern of motion) and compare these features to the features of the stored walking gait.

At block 510, when the biometric data matches the biometric signature, the smart ring 101 authenticates the user by updating a record to indicate that the user has been identified and authenticated as the known user associated with the biometric signature. If the collected biometric data matches a biometric signature, then the smart ring 101 has both (1) identified the particular user as the known user associated with the biometric signature, and (2) authenticated the particular user to actually be the known user associated with the biometric signature.

The smart ring 101 updates the record by recording in the memory unit 144 an indication of the positive match between the collected biometric data and the biometric signature. The record, for example, may correspond to a location in the memory unit 144 that devices external to the smart ring 101 and/or components internal to the smart ring 101, such as the processor unit 142, can query to determine whether the user is authenticated. Alternatively or in addition, whenever the controller 140 determines that the record has been updated to reflect that an authentication operation has been performed, the controller 140 can communicate this update to devices and/or components external or internal to the smart ring 101 (e.g., by transmitting a signal).

The update to the record may indicate why the smart ring 101 determined that the user has been authenticated (e.g., the record may indicate that collected biometric data matched a biometric signature), or the update to the record may indicate that the current wearer of the ring is an authenticated user, e.g., that the smart ring 101 is in an authenticated state. If the sensor unit 150 determines that the user has removed the smart ring 101 from their finger (e.g., because the sensor unit 150 can no longer detect any pulse, much less a specific heartbeat pattern), then the smart ring 101 may update the record to indicate that the smart ring 101 is no longer in an authenticated state.

If the smart ring 101 determines that the collected biometric data does not match the biometric signature, then the smart ring 101 may not update the record at all, or may update the record to indicate that a failed authentication operation has occurred. If the smart ring 101 detects a failed authentication (whether a biometric authentication operation, a gestural authentication operation as described with reference to FIG. 6A, or a proximity authentication operation as described with reference to FIG. 6B and FIG. 7), the smart ring 101 will not authenticate the user. The smart ring 101 may communicate (e.g., via output unit 190 or a paired device) to the user that the user has not been authenticated or that an authentication operation has failed. The smart ring 101 may prompt the user to re-authenticate themselves, for example, by putting the smart ring 101 back on a finger or performing an authentication gesture.

Note, while the example method 500 authenticates the wearer of the smart ring 101 using biometric data including a heartbeat pattern of the wearer, other implementations may include additional authentication operations. For example, the smart ring 101 may authenticate the wearer using gestural data, proximity data, or a combination thereof, using techniques described with reference to FIG. 6A, FIG. 6B, and FIG. 7. The smart ring 101 may also authenticate the wearer by requesting a PIN number or password from the wearer (e.g., via the output unit 190) and comparing a user-provided PIN number or password to a PIN number or password stored on the smart ring 101. After each authentication operation, the smart ring 101 can update the record to indicate that the wearer has been authenticated based at least in part upon the authentication operation. The smart ring 101 may also update the record after the wearer has been authenticated as the known user based at least in part upon more than one authentication operation. Different applications may need that the wearer be authenticated based at least in part upon more than one authentication operation. For example, if an application needs that the user be authenticated using two authentication factors, and a first authentication operation succeeds in authenticating the user based at least in part upon a first authentication factor while a second authentication operation fails to authenticate the user based at least in part upon a second authentication factor, then the user may not be authenticated or may not be allowed to access the application.

As one example, the smart ring 101 may repeat steps 504, 506, 508, and 510 before performing step 512 using additional biometric data. As mentioned above, the smart ring 101 may, in addition to collecting a heartbeat pattern, also collect data corresponding to a walking gait of the user. The collected walking gait may be compared to a biometric signature corresponding to a walking gait pattern of a known user in order to determine whether the collected walking gait matches the biometric signature. If so, then the smart ring 101 can update the record to indicate that the user has been identified and authenticated as the known user based at least in part upon walking gait. In such implementations, the smart ring 101 may perform step 512 only after the record indicates that the user has been authenticated as the known user based at least in part upon both heartbeat pattern data and walking gait pattern data.

At block 512, when the record indicates that the user has been identified and authenticated, the smart ring 101 performs a cryptographic operation, such as digitally signing transaction data using a cryptographic key stored on the memory unit 144 of the smart ring 101. As mentioned previously, the smart ring 101 may perform steps 506, 508, 510 and 512 in response to a specific request by the user to perform a cryptographic operation. In response to the smart ring 101 identifying and authenticating the user, and reflecting this authentication by updating the record, the smart ring 101 can then perform the cryptographic operation. In other words, by updating the record, the smart ring 101 (*i*) indicates that the user has been identified and authenticated as a known user and (ii) grants authorization to the user to access the cryptographic keys associated with the known user and stored on the smart ring 101, As mentioned previously, while example method 500 authenticates the user based at least in part upon biometric data, in other implementations, step 512 may only be performed after the user is authenticated based at least in part upon multiple authentication operations.

A transaction may refer to any exchange of data, information, or currency, including cryptocurrency such as Bitcoin. While referred to as an "exchange," it is understood that the transaction may comprise one-way output rather than a two-way exchange. Conventionally, information related to transactions are stored in centralized databases held by participants of the transactions or third-party arbiters. However, the transaction data that the smart ring digitally signs or encrypts with a private key can be transaction data of a blockchain. Below is a brief discussion of a blockchain and the secure transactions that the blockchain may facilitate.

A blockchain (e.g., an example of a distributed ledger) is a way of achieving a distributed consensus on the validity or invalidity of information in the chain. In other words, the blockchain provides a decentralized trust to participants and observers. As opposed to relying on a central authority, a blockchain is a decentralized database in which a transactional record of changes to the ledger is maintained and validated by each node of a peer-to-peer network. The distributed ledger is comprised of groupings of transactions organized together into a "block," and ordered sequentially (thus the term "blockchain").

The nodes that share the ledger form what is referred to herein the distributed ledger network. The nodes in the distributed ledger network validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supplies a proof-of-identity such that only approved entities may originate changes to the chain. A consensus rule may need that blocks and transactions adhere to format need and supply certain meta information regarding the change (e.g., blocks must be below a size limit, transactions must include a number of fields, etc.). Consensus rules may include a mechanism to determine the order in which new blocks are added to the chain (e.g., through a proof-of-work system, proof-of-stake, etc.).

Additions to the blockchain that satisfy the consensus rules are propagated from nodes that have validated the addition to other nodes that the validating node is aware of. if all the nodes that receive a change to the blockchain validate the new block, then the distributed ledger reflects the new change as stored on all nodes, and it may be said that distributed consensus has been reached with respect to the new block and the information contained therein. Any change that does not satisfy the consensus rule is disregarded by validating nodes that receive the change and is not propagated to other nodes. Accordingly, unlike a traditional system which uses a central authority, a single party cannot unilaterally alter the distributed ledger unless the single party can do so in a way that satisfies the consensus rules. The inability to modify past transactions leads to blockchains being generally described as trusted, secure, and immutable.

The validation activities of nodes applying consensus rules on a blockchain network may take various forms. In one implementation, the blockchain may be viewed as a shared spreadsheet that tracks data such as the ownership of assets. In another implementation, the validating nodes execute code contained in "smart contracts" and distributed consensus is expressed as the network nodes agreeing on the output of the executed code.

When entities communicate with nodes of the blockchain to initiate or to add data to a smart contract or secure transaction, the transaction may be accompanied by a proof-of-identity of the entity. The cryptographic proof-of-identity can be included in transactions sent to the blockchain. For example, each entity (e.g., a particular user) may own private cryptographic keys that are associated with public cryptographic keys known to belong to the entity (e.g., public cryptographic keys associated with each of the entities may be published by a trusted third party or proven to other network participants, etc.). The private cryptographic key may be, for example, a unique alphanumeric string of numbers and letters generated by a random number generator. An entity wishing to send a transaction to the blockchain may sign a cryptographic message in the transaction with the entity's private cryptographic key to prove the identity of the entity sending the transaction. In this way, other network participants may be provided with cryptographic proof that the information contained in the transaction was originated by the participating entity.

Returning to FIG. 5, at block 512, if the smart ring 101 identifies and authenticates the user as a known user, then the smart ring may sign (e.g., encrypt) transaction data with the private cryptographic keys of the known user. A known user's private cryptographic keys may be stored on the memory unit 144 of the smart ring 101. The private cryptographic keys are associated with the known user and no other user. Thus, the smart ring 101 must identify and authenticate the user as the known user before signing transaction data with the known user's private cryptographic keys.

The smart ring 101 may generate private cryptographic keys and store the keys on the memory unit 144. In some instances, the smart ring 101 may generate a key for the known user in response to authenticating the user as the known user. The smart ring 101 may generate the private key using a random number generator according to a seed value securely stored on the smart ring. The seed value is a number that is unique to the known user. During an enrollment or set-up mode, a known user may enter a seed value into the smart ring 101 using a paired device or the user input unit 170. Alternatively, the known user may enter a seed phrase that the smart ring 101 translates into a corresponding seed value. Further, the smart ring 101 may generate the seed value and/or seed phrase for the known user. The smart ring 101 may associate the seed value and/or seed phrase with the known user, for example by securely storing the seed value and/or seed phrase in a profile of the known user.

The smart ring 101 may sign the transaction data in a variety of ways. For example, the transaction data itself may be communicated to the smart ring 101 by an external computing device. The smart ring 101 then can sign the received transaction data locally at the smart ring 101. In other scenarios, the smart ring may communicate with an external computing device, which may be a blockchain node or may be another device, such as the user device 104, in communicative connection with a blockchain, to digitally sign the transaction data.

The transaction data may correspond to any transaction facilitated by a blockchain. For example, the transaction data may be a smart contract. A smart contract is a computer protocol that enables the automatic execution and/or enforcement of an agreement between different parties. The smart contract may be computer code that is located at a particular address on a blockchain. The smart contract may include one or more trigger conditions that, when satisfied, correspond to one or more actions. For some smart contracts, the actions performed may be determined based at least in part upon one or more decision conditions. In some instances, data streams may be routed to the smart contract so that the smart contract may detect that a trigger condition has occurred and/or analyze a decision condition.

The user may seek to initiate or create a smart contract and deploy the smart contract on the blockchain, or the user may need to add information to a deployed smart contract. The user may update or create the smart contract using a device communicatively connected to a blockchain network, such as the smart ring 101 or another external device, such as the user device 104, the mobile device 106, the personal computer 444, or the mobile device 422. The smart ring 101 operates to encrypt the smart contract by digitally signing the smart contract using a private cryptographic key of the known user once the user is authenticated as the known user.

As another example, the transaction data may relate to a cryptocurrency transaction, such as a Bitcoin transaction. The particular user may seek to transfer cryptocurrency to an address on a blockchain. To confirm the transaction, the particular user signs the transaction with a private key. As in the case of the smart contract, the smart ring 101 signs the cryptocurrency transaction using a private cryptographic key of the known user once the user is authenticated as the known user.

After authenticating the wearer as the known user, the smart ring 101 may perform other cryptographic operations and/or security functions. For example, the smart ring 101 may decrypt transaction data using a private or public cryptographic key. The smart ring 101 may also grant authorization to the user to access digital and/or physical resources. Further examples of the security function the smart ring 101 can perform are discussed herein with reference to FIG. 6A, FIG. 6B, and FIG. 7. It should be understood that the various authentication techniques (e.g., authentication based at least in part upon biometric, gestural, or proximity data) can be combined to perform any combination of the operations discussed herein (e.g., unlocking a resource or performing a cryptographic operation).

Figure 6A:
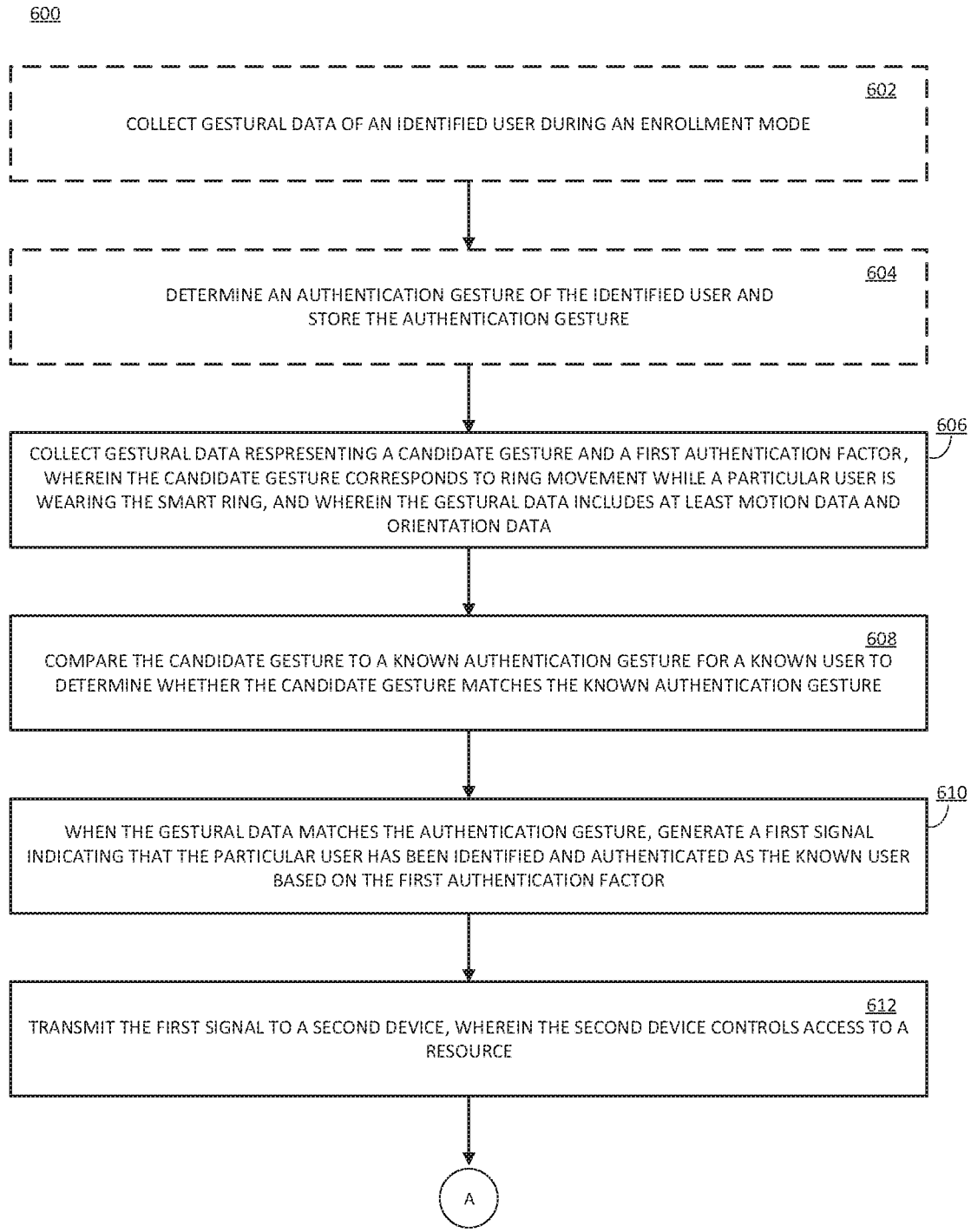
FIG. 6A and FIG. 6B illustrate an example method for performing multi-factor authentication using a smart ring according to one embodiment.
Figure 6B:
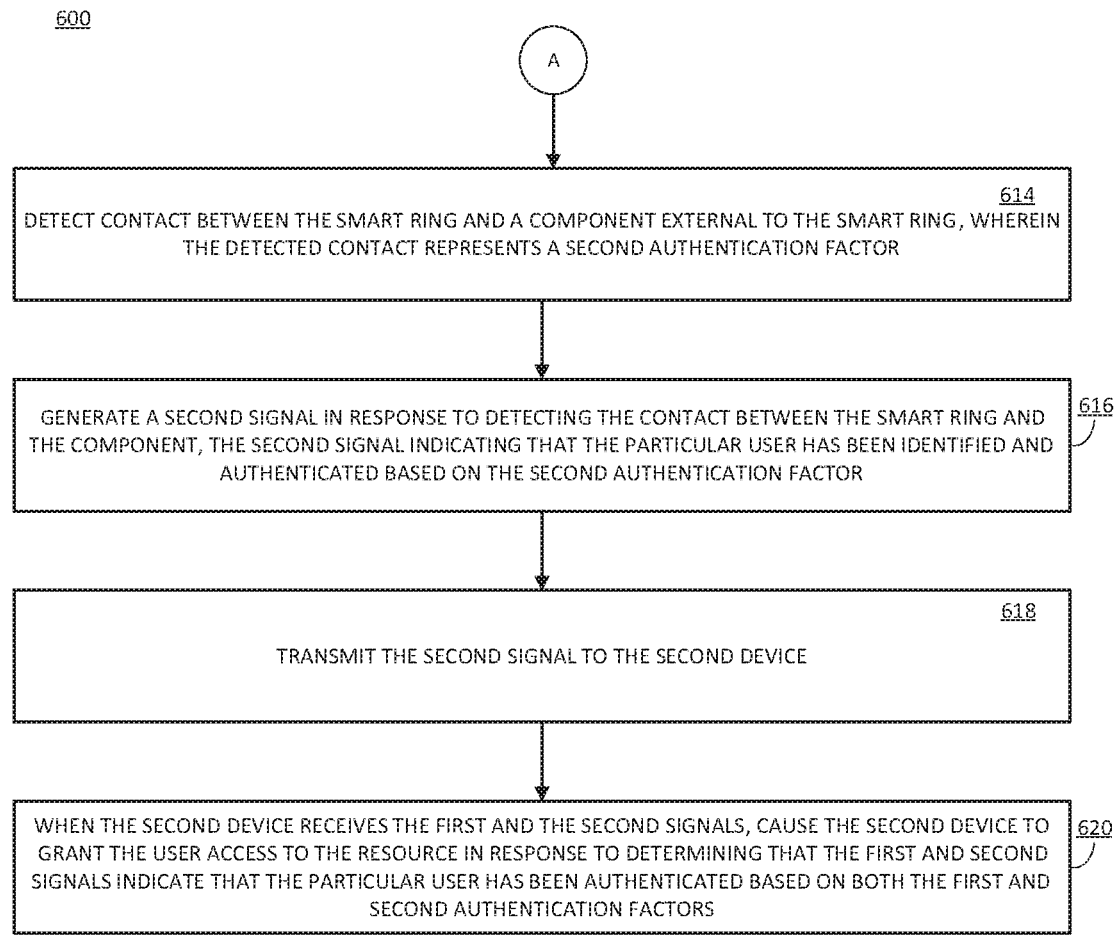

FIG. 6A and FIG. 6B illustrate an example method 600 for performing multi-factor authentication using the smart ring 101 according to one embodiment. In some implementations, the method 600 can begin at block 602. In other implementations, the method 600 may begin at block 606.

In the example method 600, the smart ring 101 performs multi-factor authentication using (i) a first authentication factor corresponding to a gesture, and (2) a second authentication factor corresponding to contact between the smart ring 101 and a component external to the smart ring. While example method 600 includes two authentication factors, the smart ring 101 is capable of performing additional authentication operations using additional, different authentication factors.

Beginning with FIG. 6A, at block 602, the sensors of the sensor unit 150 collect gestural data of a user during an enrollment mode or set-up mode of the smart ring 101. The smart ring 101 may perform block 602 in a manner similar to block 502. The smart ring 101 may enter an enrollment mode in order to register a new user to utilize the smart ring 101, or to update a profile of an existing known user of the smart ring 101. During the enrollment mode, a user may provide an identification to the smart ring 101 besides the gestural data, in order for the smart ring 101 to associate the collected gestural data with a particular identity. For instance, the user may set up a profile on the smart ring 101 itself or by paring the smart ring 101 with another device, such as the mobile device 422 or the mobile device 106. The user may provide a username associated with the user and/or some other suitable form of identification such that the smart ring 101 can associate gestural data collected during the enrollment mode to an identified, known user. During the same enrollment mode, the smart ring 101 may collect both gestural and biometric data.

While the smart ring 101 is in the enrollment mode, the user can perform a specific gesture that the user wishes to associate with their identity. The smart ring 101 may itself prompt the user to perform the gesture (e.g., via output unit 190) or the user device 104 or the mobile device 106 paired with the smart ring 101 may prompt the user. In this way, the smart ring 101 can determine that motion and movement data collected directly after the prompt is to be associated with a specific gesture. The smart ring 101 may prompt the user to perform the gesture several times in order for the smart ring 101 to identify the gestural pattern.

At block 604, the smart ring 101 determines an authentication gesture of the identified user based at least in part upon the gestural data collected during the enrollment mode and stores the authentication gesture. The smart ring 101 may determine the authentication gesture using the controller 140. Additionally or alternatively, the smart ring 101 may communicate all or a portion of the collected gestural data to the server 107, the user device 104, the mobile device 106, the personal computer 444, or the mobile device 422, which may in turn perform the analysis to determine the authentication gesture. In some cases, no processing may be needed to determine the authentication gesture; the gestural data (e.g., the motion and orientation data corresponding to the gesture) may simply be stored as-is (e.g., as collected by the sensor unit 150). In other cases, the analyzing device (whether it is the smart ring 101 or an external device) may determine parameters and/or patterns based at least in part upon the gestural data and assign these parameters and/or patterns as the authentication gesture. In any case, the authentication gesture is associated with the particular identified user.

As an example, the smart ring 101 may collect motion and orientation data of the identified user during the enrollment mode while the identified user performs a secret gesture known only to the identified user. The analyzing device can determine the specific pattern of movement and orientation of the collected data, and classify this specific pattern as an authentication gesture associated with the identified user. This specific pattern can then be stored as an authentication gesture.

The analyzing device itself may store the authentication gesture. In some implementations, the analyzing device may communicate the authentication gesture to the smart ring 101, and the smart ring 101 may store the authentication gesture on memory unit 144. Alternatively or in addition, the analyzing device may communicate the authentication gesture to the server 107, which may function as an authentication server, as mentioned previously.

At blocks 606, 608, 610 and 612, the smart ring 101 performs a first authentication operation. Beginning at block 606, the sensor unit 150 collects, outside of the enrollment mode, gestural data representing a candidate gesture and a first authentication factor. The candidate gesture corresponds to ring movement while a user is wearing the smart ring. The gestural data include motion and orientation data collected by the sensor unit 150.

The smart ring 101 may collect the gestural data in response to a request from the user made using the user input unit 170. For example, the user may indicate to the smart ring 101 that the smart ring 101 should authenticate the user as a known user so that the user may access a particular resource. Alternatively, the smart ring 101 may collect the gestural data in response to receiving a signal from a second device external to the smart ring 101. The second device controls access to a physical or digital resource. For example, the second device may correspond to the secure access panel 432 controlling access to a physical resource. As another example, the second device may be a device that controls access to digital information, such as the mobile device 422, the server 442, the personal computer 444, or another smart ring 436 or other wearable device worn by another user. When the smart ring 101 is in proximity to the second device, the second device may transmit a signal to the smart ring 101 indicating that the smart ring 101 should authenticate the wearer of the smart ring 101 in order to access the resource. The smart ring 101 may indicate to the user (e.g., via the output unit 190) that the user should perform an authentication gesture in order to authenticate themselves.

The smart ring 101 (or a separate analyzing device, in a manner analogous to block 604) can determine a pattern of movement and orientation of the collected gestural data which corresponds to a candidate gesture. At block 608, the smart ring 101 compares candidate gesture to an authentication gesture for a known user to determine whether the candidate gesture matches the authentication gesture. If optional steps 602-604 have not been performed, the smart ring 101 may compare the candidate gesture to authentication gestures included in a general database of authentication gestures for known individuals stored externally, such as at the server 107. In implementations where steps 602-604 have been performed, then the candidate gesture is compared to the authentication gesture collected while the smart ring 101 was in an enrollment mode. The authentication gesture may be stored at the smart ring 101, such as in the memory unit 144, or may be stored on an external device such as the server 107, the user device 104, the mobile device 106, the personal computer 444, or the mobile device 422. In implementations where the authentication gesture is stored at a device external to the smart ring 101, the smart ring 101 may communicate all or a portion of the collected gestural data to the external device in order to facilitate comparison between the candidate gesture and the authentication gesture.

The external device or the smart ring 101 then compares the candidate gesture to the stored authentication gesture. The stored authentication gesture is associated with a previously identified, known user. If the smart ring 101 causes the external device to perform the comparison, the external device can communicate the results of the comparison to the smart ring 101.

The candidate gesture and the stored authentication gesture do not need to match exactly. The smart ring 101 can determine that the candidate gesture and the stored authentication gesture match if the gestures or the gestural data corresponding to the gestures are similar within a tolerance or suitable threshold. A suitable threshold may be, for example, based at least in part upon the uncertainty of the motion and orientation measurements made by the sensor unit 150.

At block 610, when the candidate gesture matches the authentication gesture, the smart ring 101 generates a signal indicating that the user has been identified and authenticated as the known user based at least in part upon the first authentication factor. Then, at block 612, the smart ring 101 transmits the signal to a second device that controls access to a resource. In other embodiments, the smart ring 101 may, in response to the candidate gesture matching the authentication gesture, additionally or alternatively update a record to indicate that the user has been identified and authenticated as the known user associated with the authentication gesture, in a manner similar to block 510.

The signal indicates that the user has been identified and authenticated as a known user. The signal may also indicate why the smart ring 101 determined that the user has been authenticated (e.g., the signal may indicate that the user has been authenticated based at least in part upon matching an authentication gesture to a candidate gesture corresponding to collected gestural data). The signal may also indicate an identity of the known user (e.g., a username or a name of the known user).

In some implementations, the smart ring 101 may determine that the known user is a user that is authorized to access the resource. The smart ring 101 may determine whether a user is authorized based at least in part upon information stored in the memory unit 144 indicating what resources can be accessed by known users. The smart ring 101 may also determine whether a user is authorized by communicating with the second device or with another external device such as the server 107. If the smart ring 101 determines that the known user is authorized to access the resource, then the signal may also indicate that the authenticated user is authorized.

Additionally or alternatively, the signal may indicate that the user has been identified and authenticated as a known user based at least in part upon the first authentication factor, but may not indicate whether that known user is authorized to access the resource. In such implementations, the second device, based at least in part upon the signal, determines whether the known user is a user that is authorized to access the resource.

In any case, the signal may be generated by the controller 140 or, more specifically, by the processor unit 142. The signal may be an electromagnetic signal that carries information indicating that the user has been authenticated. The generated signal may be transmitted to the second device by the communication unit 160.

Continuing on to FIG. 6B, which illustrates additional steps of example method 600, at blocks 614, 616, and 618, the smart ring 101 performs a second authentication operation. It is understood that while the second authentication operation (e.g., blocks 614, 616, and 618) is depicted as taking place after the first authentication operation (e.g., blocks 606, 608, 610 and 612), the order of the first and second authentication operations may be switched. Further, each of the authentication operations may occur simultaneously. For example, the user may perform a gesture that also involves a bump (e.g., contact, discussed in further detail below with respect to block 614) of the smart ring 101 with a second device. The smart ring 101 may only perform the second authentication operation if the first authentication operation positively authenticates the user as a known user. Further, the smart ring 101 may only perform the second authentication operation if contact (block 614) is detected within a short amount before or after the gestural data are collected (block 606) (e.g., less than 10-30 seconds).

Beginning at block 614, the sensor unit 150 detects contact between the smart ring 101 and a component external to the smart ring 101. The detected contact represents a second authentication factor. The contact that the sensor unit 150 detects may be physical contact between the smart ring 101 and the component, or may be close physical proximity (e.g., on the order of centimeters or on the order of the thickness of the housing 110). For example, tactile sensors of the smart ring 101 may detect physical contact or a physical "bump" between the smart ring 101 and the component. As another example, proximity sensors, such as an NFC device, may detect signal(s) transmitted between the smart ring 101 and an NFC circuit of the component, indicating that the smart ring 101 is within NFC-range of the component.

The component external to the smart ring 101 may be a component of the second device which controls access to the resource. For instance, the component may be an NFC circuit within the housing of the second device. As an example, the second device may be the secure access panel 432. The wearer of the smart ring 101 may perform a gesture with the hand wearing the smart ring 101 and then perform a bump between the smart ring 101 and the secure access panel 432.

In other implementations, the component external to the smart ring 101 may be a third device, distinct from and external to the smart ring 101 and the second device. For example, the component may be another ring of the user (e.g., the ring 424), another device (e.g., the mobile device 422, the user device 104, or the mobile device 106), or a hardware token.

At block 616, in response to detecting the contact between the smart ring 101 and the component, the smart ring 101 generates a second signal, and the smart ring 101 transmits the second signal to the second device at block 618. The signal may be an electromagnetic signal that carries information indicating that the smart ring 101 has made contact with the component. The signal indicates that the particular user has been identified and authenticated as the known user based at least in part upon the second authentication factor. As in blocks 610 and 612, the controller 140 (or more specifically the processor unit 142) may generate the signal at block 616 and the communication unit 160 may transmit the signal.

The smart ring 101 may perform steps 616 and 618 in response to the fact that the smart ring 101 has contacted the component. In some implementations, the smart ring 101 may also receive additional information from the component before performing steps 616 and 618. For instance, during the contact and/or the proximity of the smart ring 101 and the component, the component may communicate an identifier of the component to the smart ring 101. The smart ring 101 may compare this identifier to stored identifiers on the memory unit 144 of the smart ring 101 or on the memory 109 of the server 107 to determine whether the component is associated with a known user. For example, the identifier may correspond to a component of a vehicle of the known user, or the identifier may correspond to a device or token of the known user. By comparing the identifier to identifiers of devices associated with the known user, the smart ring 101 (possibly in conjunction with the server 107) can determine that (a) the second device is associated with the known user, in the case where the component is a component of the second device, or (b) the user is in possession of a component associated with the known user, in the case where the component is a third device. In response to receiving an identifier associated with the known user, the smart ring 101 may then perform steps 616 and 618. The signal transmitted at 618 may indicate that the received identifier is associated with the known user.

In addition, the smart ring 101 may receive a signal from the component indicating that the component has detected contact with the smart ring 101. The smart ring 101 may perform steps 616 and 618 in response to receiving this signal. In some implementations, the smart ring 101 may only perform steps 616 and 618 if the smart ring 101 receives this signal from the component within a short time period of detecting the contact with the component (e.g., on the order of 10-30 seconds or less).

At block 620, when the second device receives the first and the second signals, the smart ring 101 causes the second device to grant the user access to the resource in response to determining that the first and second signals indicate that the particular user has been authenticated based at least in part upon both the first and second authentication factors. As mentioned previously, the second device may grant access to the resource upon receiving the first and the second signals and determining that the first and second signals indicate that the particular user has been authenticated as a known user, or the second device may need to perform additional processing to determine whether the authenticated user is authorized to access the resource.

The resource may be a physical resource or a digital resource. For example, in the case where the second device is the secure access panel 432, the second device may grant access to a physical space in response to receiving the first and second signals. In other scenarios, the second device may be a computing device, such as the mobile device 422 or the personal computer 444. In response to receiving the first and the second signals, the computing device may grant the smart ring 101 or the user access to digital information stored on the computing device or accessible through the computing device. Still further, the resource may be control over the second device or a device that the second device manages access to. For instance, the second device may manage access to control over a vehicle, a security system, or a computing device.

In the case where the second device is another smart ring 436 worn by another user, the other smart ring 436 may similarly transmit signals to the smart ring 101 indicating that the other wearer is an authenticated user and that the other smart ring 436 has been in contact or proximity with the smart ring 101. In response to receiving these signals from the other smart ring 436, the smart ring 101 may grant the smart ring 436 access to an information resource that the smart ring 101 controls access to, such as digital information stored on the smart ring 101 or on a device paired with the smart ring 101 such as the user device 104, the mobile device 106, or the server 107. The smart ring 101 may, based at least in part upon the received signals, determine whether the authenticated user is authorized to access the information resource by, for example, comparing the identity of the authenticated user included in the signal to known users stored on the smart ring 101 or the server 107.

If the smart ring 101 grants access to the smart ring 436, and the smart ring 436 has similarly granted the smart ring 101 access within a short period of time (e.g., on the order of seconds or minutes), then two rings 101, 436 may perform or allow an exchange of information between the two rings 101, 436 or devices in communication with the two rings 101, 436 and associated with their respective users. Further, the two rings 101, 436 may execute an agreement; such as a contract, between the two users. For example, each ring may sign an agreement between the user of the ring and the user of the other ring using an identity of the user of the ring. Such situations may occur; for example; if the two users perform a secret handshake gesture that either includes a bump is or is performed directly before or directly after a bump. Each user may also perform an individual gesture that does not involve the other user's hand but that is performed either directly before or directly after a bump between the two rings.

Figure 7:
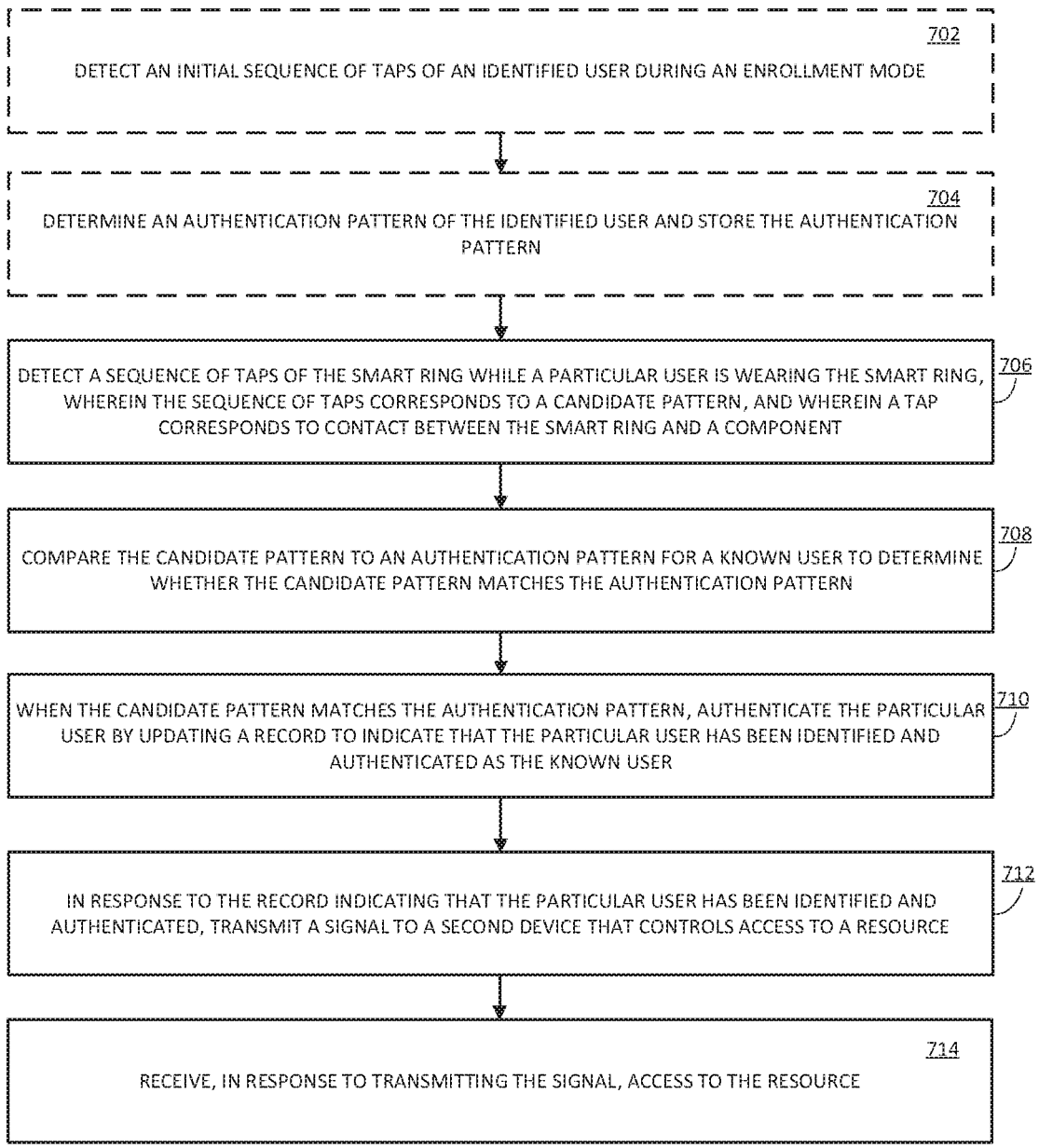
FIG. 7 illustrates an example method for identifying and authenticating a user using contact data collected by a smart ring indicating a sequence of taps of the smart ring according to one embodiment.

FIG. 7 illustrates an example method 700 for identifying and authenticating a user using contact data collected by the smart ring 101 indicating a sequence of taps of the smart ring 101 according to one embodiment. In the example method 700, the smart ring 101 performs an authentication operation using an authentication factor corresponding to a sequence of taps. In some implementations, the method 700 can begin at block 702, In other implementations, the method 700 may begin at block 706.

At block 702, sensors of the smart ring 101 (e.g., sensor unit 150) detect a sequence of taps of the smart ring 101 during an enrollment mode or set-up mode of the smart ring 101 by collecting contact data. The smart ring 101 may perform block 702 in a manner similar to blocks 602 and 502. The smart ring 101 may enter an enrollment mode in order to register a new user to utilize the smart ring 101, or to update a profile of an existing known user of the smart ring 101. During the enrollment mode, a user may provide an identification to the smart ring 101 besides the contact data indicating the sequence of taps, in order for the smart ring 101 to be associated the detected sequence of taps with a particular identity. For instance, the user may set up a profile on the smart ring 101 itself or by pairing the smart ring 101 with another device, such as the mobile device 422 or the mobile device 106. The user may provide a username associated with the user and/or some other suitable form of identification such that the smart ring 101 can associate the sequence of taps detected during the enrollment mode to an identified, known user. During the same enrollment mode, the smart ring 101 may collect biometric, gestural, and contact data.

While the smart ring 101 is in the enrollment mode, the user can tap the smart ring in a particular sequence that the user wishes to associate with their identity. The smart ring 101 may itself prompt the user to perform the sequence of taps (e.g., via output unit 190) or the user device 104 or the mobile device 106 paired with the smart ring 101 may prompt the user, In this way, the smart ring 101 can determine that contact data collected directly after the prompt is to be associated with a specific sequence of taps. The smart ring 101 may prompt the user to perform the sequence of taps several times in order for the smart ring 101 to identify a pattern corresponding to the sequence of taps.

A "tap" corresponds to the smart ring 101 detecting contact with a component external to the smart ring 101. Thus, while the sequence of taps may correspond to a user tapping on the smart ring 101 or a portion of the smart ring 101 (e.g., tapping on the smart ring 101 with a finger of the user), the sequence of taps may correspond with the user tapping the smart ring 101 against any object external to the smart ring 101, such as a door, computing device, or other smart ring. The contact data indicating the sequence of taps may include, for example, acceleration, vibration, and tactile data indicating a tap of the smart ring with another object. The smart ring 101 may differentiate a deliberate tap from background vibration based at least in part upon the contact data. For example, the smart ring 101 may compare the magnitudes of the detected vibration, acceleration, or force applied to the smart ring 101 to threshold magnitudes comparable to background or accidental contact.

Contact that the sensor unit 150 detects as a tap of the sequence of taps may be physical contact between the smart ring 101 and another object. Multiple taps detected within a short time period (e.g., on the order of seconds or fractions of a second) may be determined by the smart ring 101 to belong to the same sequence of taps.

At block 704, the smart ring 101 determines an authentication pattern of the identified user based at least in part upon the sequence of taps detected during the enrollment mode and stores the authentication pattern. The smart ring 101 may determine the authentication pattern using the controller 140. Additionally or alternatively, the smart ring 101 may communicate all or a portion of the collected contact data to the server 107, the user device 104, the mobile device 106, the personal computer 444, or the mobile device 422, which may in turn perform the analysis on the contact data to determine the authentication pattern. The authentication pattern corresponds to the pattern of the detected sequence of taps. The analyzing device (whether it is the smart ring 101 or an external device) may determine features of the sequence such as, for example, the rhythm, tempo, frequency, or beat of the taps, or the time between each tap. The collection of sequence features may collectively make up the authentication pattern.

In addition to associating the authentication pattern with the identified user, the smart ring 101 may also associate the authentication pattern with unlocking a single resource or with unlocking access to multiple resources. For example, if the smart ring 101 detects proximity to a second device controlling access to a resource while (or shortly before or after) detecting the sequence of taps, the smart ring 101 may associate the authentication pattern with the particular second device. The second device may transmit an identifier of the second device to the smart ring 101 in order for the smart ring 101 to associate the authentication pattern with the second device. The second device may transmit the identifier in response to a request from the smart ring 101, or in response to detecting proximity of the smart ring 101 or contact with the smart ring 101. Alternatively or additionally, using the user input unit 170 or a paired device, the user may indicate to the smart ring 101 that the authentication pattern is to be associated with unlocking a particular resource or device.

In some implementations, the smart ring 101 may associate the authentication pattern with the smart ring 101 making contact with a particular object. For instance, the smart ring 101 may detect that the sequence of taps has been made against a particular second device controlling access to a resource or against a particular component (e.g., the device or component may transmit an identifier to the smart ring 101).

In any case, the smart ring 101 associates the authentication pattern with the particular identified user. As an example, the smart ring 101 may collect contact data during the enrollment mode while the user performs taps the smart ring 101 against an object in a unique pattern known only to the user. The smart ring 101 detects the sequence of taps based at least in part upon the contact data. The analyzing device can determine the specific pattern corresponding to the sequence of taps, and classify this specific pattern as an authentication pattern associated with the identified user. This specific pattern can then be stored as an authentication pattern.

The analyzing device itself may store the authentication pattern. In some implementations, the analyzing device may communicate the authentication pattern to the smart ring 101, and the smart ring 101 may store the authentication pattern on the memory unit 144. Alternatively or in addition, the analyzing device may communicate the authentication pattern to the server 107, which may function as an authentication server, as mentioned previously.

At block 706, sensors of the smart ring 101 collect, outside the enrollment mode, contact data indicating a sequence of taps between the smart ring 101 and a component external to the smart ring. The smart ring 101 may constantly collect contact data in order to detect when a user deliberately taps the smart ring 101 against an object in a pattern. Alternatively or additionally, the smart ring 101 may collect contact data in response to a request from the user made using the user input unit 170. For example, the user may indicate to the smart ring 101 that the smart ring 101 should authenticate the user as a known user so that the user may access a particular resource. Still further, the smart ring 101 may collect the contact data in response to receiving a signal from a second device external to the smart ring 101. The second device controls access to a physical or digital resource. For example, the second device may correspond to the secure access panel 432 controlling access to a physical resource. As another example, the second device may be a device that controls access to digital information, such as the mobile device 422, the server 442, the personal computer 444, or another smart ring 436 or other wearable device worn by another user. When the smart ring 101 is in proximity to the second device, the second device may transmit a signal to the smart ring 101 indicating that the smart ring 101 should authenticate the user of the smart ring 101 in order to access the resource. The smart ring 101 may indicate to the user (e.g., via the output unit 190) that the user should perform an authentication pattern in order to authenticate themselves.

The sensor unit 150 detects the sequence of taps corresponding to the candidate pattern in a manner analogous to how the sensor unit 150 detects the sequence of taps corresponding to the authentication pattern while the smart ring 101 is in an enrollment mode. The user may cause the smart ring 101 to come into contact with a physical body part of the user (e.g.; the user may tap the smart ring 101 with a finger), or with another component external to the smart ring 101 (e.g., the user may tap the smart ring 101 against another object). The component may be a component of the second device which controls access to the resource. For instance, the second device may be the secure access panel 432. The wearer of the smart ring 101 may perform a sequence of taps with the smart ring 101 against the secure access panel 432. In other implementations, the component external to the smart ring 101 may be a third device or object, distinct from and external to the smart ring 101 and the second device. For example, the component may be another ring of the user (e.g., the ring 424), another device (e.g., the mobile device 422, the user device 104, the mobile device 106, another smart ring 436), or a hardware token. The component could also be a non-electronic object, such as a door (e.g., a user could perform a sequence of taps against a door corresponding to a coded or secret knock).

The smart ring 101 (or a separate analyzing device, in a manner analogous to block 704) can determine that the sequence of taps corresponds to a candidate pattern. At blocks 708-710, the smart ring performs an authentication operation by (i) comparing the candidate pattern to an authentication pattern for a known user to determine whether the candidate pattern matches the authentication pattern (block 708), and (ii) when the candidate pattern matches the authentication pattern, authenticating the particular user by updating a record to indicate that the particular user has been identified and authenticated as the known user (block 710).

More particularly, at block 708, the smart ring 101 compares the candidate pattern collected and determined at block 706 to an authentication pattern for a known user to determine whether the candidate pattern matches the authentication pattern. If optional steps 702 and 704 have not been performed, the smart ring 101 may compare the candidate pattern to authentication patterns included in a general database of authentication patterns for known individuals stored externally, such as at the server 107. In implementations where steps 702 and 704 have been performed, then the candidate pattern is compared to the authentication pattern collected while the smart ring 101 was in an enrollment mode. The authentication pattern may be stored at the smart ring 101, such as in the memory unit 144, or may be stored on an external device, such as the server 107, the user device 104, the mobile device 106, the personal computer 444, or the mobile device 422. In implementations where the authentication pattern is stored at a device external to the smart ring 101, the smart ring 101 may communicate all or a portion of the collected contact data to the external device to facilitate comparison between the candidate pattern and the authentication pattern.

The external device or the smart ring 101 then compares the candidate pattern to the stored authentication pattern. The stored authentication pattern is associated with a previously identified, known user. If the smart ring 101 causes the external device to perform the comparison, the external device can communicate the results of the comparison to the smart ring 101.

The candidate pattern and the stored authentication pattern do not need to match exactly. The smart ring 101 can determine that the candidate pattern and the stored authentication pattern match if the features of the sequences of taps or the contact data corresponding to the sequences of taps are similar within a tolerance or suitable threshold. A suitable threshold may be, for example, based at least in part upon the uncertainty of the contact data measurements made by the sensor unit 150, or on the precision of the human mind in performing a time-dependent rhythm.

At block 710, when the candidate pattern matches the authentication pattern, the smart ring 101 authenticates the user by updating a record to indicate that the user has been identified and authenticated as the known user associated with the authentication pattern. If the collected candidate pattern matches the authentication pattern, then the smart ring 101 has both (1) identified the particular user as the known user associated with the authentication pattern, and (2) authenticated the particular user to actually be the known user associated with the authentication pattern.

The smart ring 101 updates the record by recording in the memory unit 144 an indication of the positive match between the collected candidate gesture and the authentication pattern. The smart ring 101 may update the record in a manner similar to block 510, for example. The record may correspond to a location in the memory unit 144 that devices external to the smart ring 101 and/or components internal to the smart ring 101, such as the processor unit 142, can query to determine whether the user is authenticated. Alternatively or in addition, whenever the controller 140 determines that the record has been updated to reflect than an authentication operation has been performed, the controller 140 can communicate this update to devices and/or components external or internal to the smart ring 101.

The update to the record may indicate why the smart ring 101 determined that the user has been authenticated (e.g., the record may indicate that the candidate pattern matched an authentication pattern), or the update to the record may indicate that the current wearer of the ring is an authenticated user, e.g., that the smart ring 101 is in an authenticated state. If the sensor unit 150 determines that the user has removed the ring 101 from their finger, then the smart ring 101 may update the record to indicate that the smart ring 101 is no longer in an authenticated state.

At block 712, in response to the record indicating that the particular has been identified and authenticated, the smart ring 101 transmits a signal to a second device that controls access to a resource. The signal indicates that the user has been identified and authenticated as a known user. Similar to the update to the record, the signal may indicate why the smart ring 101 determined that the user has been authenticated (e.g., the signal may indicate that the user has been authenticated based at least in part upon matching a candidate pattern to an authentication pattern of a known user). The signal may also indicate an identity of the known user (e.g., a username or a name of the known user) and/or an identifier of the smart ring 101. It is understood that in other example methods, additional authentication operations may be performed by the smart ring prior to transmitting the signal at block 712, or prior to receiving access to the resource at block 714.

In some implementations, the smart ring 101 may determine that the known user is a user that is authorized to access the resource. The smart ring 101 may determine whether a user is authorized based at least in part upon information stored in the memory unit 144 indicating what resources can be accessed by known users. The smart ring 101 may also determine whether a user is authorized by communicating with the second device or with another external device such as the server 107. If the smart ring 101 determines that the known user is authorized to access the resource, then the signal may also indicate that the authenticated user is authorized. Further, the smart ring 101 may only transmit the signal in response to determining that the authenticated user is authorized.

Additionally or alternatively, the signal may indicate that the user has been identified and authenticated as a known user based at least in part upon an authentication factor corresponding to an authentication pattern, but may not indicate whether that known user is authorized to access the resource. In such implementations, the second device, based at least in part upon the signal, determines whether the known user is a user that is authorized to access the resource.

In any case, the signal may be generated by the controller 140 or, more specifically, by the processor unit 142. The signal may be an electromagnetic signal that carries information indicating that the user has been authenticated. The generated signal may be transmitted to the second device by the communication unit 160.

In some implementations, the smart ring 101 may also receive additional information from the component that the smart ring 101 has contacted or from the second device controlling access to the resource before updating the record at 710 or transmitting the signal at 712. For instance, during the sequence of taps is and/or the proximity of the smart ring 101 and the component, the component may communicate an identifier of the component to the smart ring 101. The authentication pattern may be associated with the identifier (as noted above with respect to block 704) such that the pattern must be performed against the particular component in order for the smart ring 101 to authenticate the user based at least in part upon the authentication pattern.

As another example, the smart ring 101 may receive an identifier from the second device that controls access to the resource (which may or may not include the component that the smart ring 101 came into contact with) when the smart ring 101 is in proximity of the second device. The authentication pattern may be associated with the second device (as noted above with respect to block 704) such that the authentication pattern only serves to authorize the authenticated user to access the resource controlled by the second device.

At block 714, when the second device receives the signal transmitted by the smart ring 101 at block 712, the smart ring 101 causes the second device to grant the user access to the resource in response to determining that the signal indicates that the particular user has been authenticated. As mentioned previously, the second device may grant access to the resource upon receiving the signal, or the second device may need to perform additional processing to determine whether the authenticated user is authorized to access the resource.

As discussed with reference to block 620, the resource may be a physical resource or a digital resource. For example, in the case where the second device is the secure access panel 432, the second device may grant access to a physical space in response to receiving the signal. In other scenarios, the second device may be a computing device, such as the mobile device 422 or the personal computer 444. In response to receiving the signal, the computing device may grant the smart ring 101 or the user access to digital information stored on the computing device or accessible through the computing device. Still further, the resource may be control over the second device or a device that the second device manages access to. For instance, the second device may manage access to control over a vehicle, a security system, or a computing device. The second device may also be another smart ring 436 worn by another user, as discussed with reference to FIG. 6.

Examples of Other Considerations

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

The described functions may be implemented, in whole or in part, by the devices, circuits, or routines of the system 100 shown in FIG. 1. Each of the described methods may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

While the present disclosure has been described with reference to specific examples, which are intended to be illustrative only and not to be limiting of the present disclosure, it will be apparent to those of ordinary skill in the art that changes, additions or deletions may be made to the disclosed embodiments without departing from the spirit and scope of the present disclosure.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification may not be all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements may not be limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. Generally speaking, when a system or technique is described as including "a" part or "a" step, the system or technique should be read to include one or at least one part or step. Said another way, for example, a system described as including a blue widget may include multiple blue widgets in some implementations (unless the description makes clear that the system includes only one blue widget).

Throughout this specification, some of the fallowing terms and phrases are used.

Communication Interface according to some embodiments: Some of the described devices or systems include a "communication interface" (sometimes referred to as a "network interface"). A communication interface enables the system to send information to other systems and to receive information from other systems, and may include circuitry for wired or wireless communication.

Each described communication interface or communications unit (e.g., communications unit 160) may enable the device of which it is a part to connect to components or to other computing systems or servers via any suitable network, such as a personal area network (PAN), a local area network (LAN), or a wide area network (WAN). In particular, the communication unit 160 may include circuitry for wirelessly connecting the smart ring 101 to the user device 104 or the network 105 in accordance with protocols and standards for NFC (operating in the 13.56 MHz band), RFI© (operating in frequency bands of 125-134 kHz, 13.56 MHz, or 856 MHz to 960 MHz), Bluetooth (operating in a band of 2.4 to 2.485 GHz), Wi-Fi Direct (operating in a band of 2.4 GHz or 5 GHz), or any other suitable communications protocol or standard that enables wireless communication.

Communication Link according to some embodiments: A "communication link" or "link" is a pathway or medium connecting two or more nodes. A link between two endnodes may include one or more sublinks coupled together via one or more intermediary nodes, A link may be a physical link or a logical link. A physical link is the interface or medium(s) over which information is transferred, and may be wired or wireless in nature. Examples of physicals links may include a cable with a conductor for transmission of electrical energy, a fiber optic connection for transmission of light, or a wireless electromagnetic signal that carries information via changes made to one or more properties of an electromagnetic wave(s).

A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

Memory and Computer-Readable Media according to some embodiments: Generally speaking, as used herein the phrase "memory" or "memory device" refers to a system or device (e.g., the memory unit 144) including computer-readable media ("CRM"). "CRM" refers to a medium or media accessible by the relevant computing system for placing, keeping, or retrieving information (e.g., data, computer-readable instructions, program modules, applications, routines, etc.). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information, and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Network according to some embodiments: As used herein and unless otherwise specified, when used in the context of system(s) or device(s) that communicate information or data, the term "network" (e.g., the networks 105 and 440) refers to a collection of nodes (e.g., devices or systems capable of sending, receiving or forwarding information) and links which are connected to enable telecommunication between the nodes.

Each of the described networks may include dedicated routers responsible for directing traffic between nodes, and, optionally, dedicated devices responsible for configuring and managing the network. Some or all of the nodes may be also adapted to function as routers in order to direct traffic sent between other network devices. Network devices may be inter-connected in a wired or wireless manner, and network devices may have different routing and transfer capabilities. For example, dedicated routers may be capable of high volume transmissions while some nodes may be capable of sending and receiving relatively little traffic over the same period of time. Additionally, the connections between nodes on a network may have different throughput capabilities and different attenuation characteristics. A fiberoptic cable, for example, may be capable of providing a bandwidth several orders of magnitude higher than a wireless link because of the difference in the inherent physical limitations of the medium. If desired, each described network may include networks or sub-networks, such as a local area network (LAN) or a wide area network (WAN).

Node according to some embodiments: Generally speaking, the term "node" refers to a connection point, redistribution point, or a communication endpoint. A node may be any device or system (e.g., a computer system) capable of sending, receiving or forwarding information. For example, end-devices or end-systems that originate or ultimately receive a message are nodes. Intermediary devices that receive and forward the message (e.g., between two end-devices) are also generally considered to be "nodes."

Processor according to some embodiments: The various operations of example methods described herein may be performed, at least partially, by one or more processors (e.g., the one or more processors in the processor unit 142). Generally speaking, the terms "processor" and "microprocessor" are used interchangeably, each referring to a computer processor configured to fetch and execute instructions stored to memory. By executing these instructions, the processor(s) can carry out various operations or functions defined by the instructions. The processor(s) may be temporarily configured (e.g., by instructions or software) or permanently configured to perform the relevant operations or functions (e.g., a processor for an Application Specific Integrated Circuit, or ASIC), depending on the particular embodiment. A processor may be part of a chipset, which may also include, for example, a memory controller or an I/O controller. A chipset is a collection of electronic components in an integrated circuit that is typically configured to provide I/O and memory management functions as well as a plurality of general purpose or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A method performed by a smart ring for enabling multi-factor authentication, the method comprising:
    performing a first authentication operation by:
        collecting, by one or more sensors of the smart ring, gestural data representing a candidate gesture and a first authentication factor associated with the candidate gesture,
    wherein the candidate gesture corresponds to ring movement while a candidate is wearing the smart ring on a finger of the candidate, and wherein the gestural data includes motion data and orientation data;
        comparing, by a processor in the smart ring, the candidate gesture to a known authentication gesture for a known user to determine whether the candidate gesture matches the known authentication gesture;
        when the candidate gesture matches the known authentication gesture, generating, by the processor in the smart ring, a first signal indicating that the candidate has been authenticated as the known user based at least in part upon the first authentication factor; and
        transmitting the first signal to a second device, wherein the second device controls access to a resource;
    performing a second authentication operation by:
        receiving an identifier from a component external to the smart ring;
        detecting, by the one or more sensors of the smart ring, contact between the smart ring and the component external to the smart ring, wherein the contact, as detected represents a second authentication factor;
        determining whether the identifier is associated with the known user;
        when the identifier is associated with the known user, generating, in response to detecting the contact between the smart ring and the component, by the processor in the smart ring, a second signal indicating that the candidate has been authenticated as the known user based at least in part upon the second authentication factor; and
        transmitting the second signal to the second device; and
    when the second device receives the first signal and the second signal, causing the second device to grant the candidate access to the resource,
    wherein the comparing the candidate gesture to a known authentication gesture for a known user comprises:
        transmitting an indication of the candidate gesture to the second device, wherein the transmitting an indication causes the second device to compare the candidate gesture to the known authentication gesture; and
        receiving, from the second device, an indication that the candidate gesture matches the known authentication gesture.

2. The method of claim 1, wherein detecting the contact between the smart ring and the component comprises: detecting data transmitted between the smart ring and an NFC circuit of the component.

3. The method of claim 1, wherein detecting the contact between the smart ring and the component comprises: the smart ring and the component both detecting, via tactile sensors and within a time period, a physical bump.

4. The method of claim 1, wherein the component is internal to a housing of the second device.

5. The method of claim 1, wherein the component is a third device, distinct from and external to the second device.

6. The method of claim 1, wherein detecting the contact between the smart ring and the component further comprises: receiving the identifier of the component from the component.

7. The method of claim 1, further comprising:
    before collecting the gestural data of the candidate, collecting, by the one or more sensors of the smart ring, initial gestural data of the known user while the known user is wearing the smart ring and while the smart ring is operating in an enrollment mode; and
    determining the known authentication gesture for the known user based at least in part upon the initial gestural data.

8. The method of claim 7, further comprising:
    storing the known authentication gesture for the known user on a memory of the smart ring; and wherein comparing the candidate gesture to the known authentication gesture for the known user comprises:
        comparing the candidate gesture to the known authentication gesture stored on the memory of the smart ring.

9. The method of claim 7, further comprising:
    transmitting, via a communication interface of the smart ring, at least a portion of the initial gestural data to the second device, wherein transmitting the at least a portion of the initial gestural data causes the second device to determine the known authentication gesture for the known user based at least in part upon the initial gestural data.

10. The method of claim 1, wherein the smart ring is a first smart ring, and wherein the second device is a second smart ring.

11. The method of claim 10, wherein the known authentication gesture is at least one of a handshake gesture or a first bump gesture.

12. A smart ring for enabling multi-factor authentication, the smart ring comprising:
a housing configured to be worn on a finger of a user;
one or more sensors included in the housing of the smart ring; and
a processor included in the housing of the smart ring and configured to:
perform a first authentication operation by:
collecting, by the one or more sensors of the smart ring, gestural data representing a candidate gesture and a first authentication factor associated with the candidate gesture, wherein the candidate gesture corresponds to ring movement while a candidate is wearing the smart ring on a finger of the candidate, and wherein the gestural data includes motion data and orientation data;
comparing, by a processor in the smart ring, the candidate gesture to a known authentication gesture for a known user to determine whether the candidate gesture matches the known authentication gesture;
when the candidate gesture matches the known authentication gesture, generating, by the processor in the smart ring, a first signal indicating that the candidate has been authenticated as the known user based at least in part upon the first authentication factor; and
transmitting the first signal to a second device, wherein the second device controls access to a resource;
perform a second authentication operation by:
receiving an identifier from a component external to the smart ring;
detecting, by the one or more sensors of the smart ring, contact between the smart ring and the component external to the smart ring, wherein the contact, as detected, represents a second authentication factor;
determining whether the identifier is associated with the known user;
when the identifier is associated with the known user, generating, in response to detecting the contact between the smart ring and the component, by the processor in the smart ring, a second signal indicating that the candidate has been authenticated as the known user based at least in part upon the second authentication factor; and
transmitting the second signal to the second device; and
when the second device receives the first signal and the second signal, cause the second device to grant the candidate access to the resource,
wherein the comparing the candidate gesture to a known authentication gesture for a known user comprises:
transmitting an indication of the candidate gesture to the second device, wherein the transmitting an indication causes the second device to compare the candidate gesture to the known authentication gesture; and
receiving, from the second device, an indication that the candidate gesture matches the known authentication gesture.

13. The smart ring of claim 12, wherein the processor is configured to detect the contact between the smart ring and the component by detecting data transmitted between the smart ring and an NFC circuit of the component.

14. The smart ring of claim 12, wherein the processor is configured to detect the contact between the smart ring and the component by detecting, via tactile sensors, a physical bump.

15. The smart ring of claim 12, wherein the component is internal to the housing of the second device.

16. The smart ring of claim 12, wherein the component is a third device, distinct from and external to the second device.

17. The smart ring of claim 12, wherein the processor is configured to detect the contact between the smart ring and the component by receiving an identifier of the component from the component.

18. The smart ring of claim 12, wherein the processor is further configured to:
before collecting the gestural data of the candidate, collect, by the one or more sensors of the smart ring, initial gestural data of the known user while the known user is wearing the smart ring and while the smart ring is operating in an enrollment mode;
determine the known authentication gesture for the known user based at least in part upon the initial gestural data; and
store the known authentication gesture for the known user on a memory of the smart ring,
wherein the processor is configured to compare the candidate gesture to the known authentication gesture for the known user by comparing the candidate gesture to the authentication gesture stored on the memory of the smart ring.

19. The smart ring of claim 12, wherein the smart ring is a first smart ring, and wherein the second device is a second smart ring.

20. The smart ring of claim 19, wherein the known authentication gesture is at least one of a handshake gesture or a fist bump gesture.

* * * * *